US008954500B2

(12) United States Patent
Marlow et al.

(10) Patent No.: US 8,954,500 B2
(45) Date of Patent: Feb. 10, 2015

(54) IDENTIFYING AND EMPLOYING SOCIAL NETWORK RELATIONSHIPS

(75) Inventors: Cameron Marlow, New York, NY (US); Marc Davis, San Francisco, CA (US); Neal Sample, Santa Cruz, CA (US); Michael Curtis, Menlo Park, CA (US); Ryan Kennedy, Santa Clara, CA (US); Yathin Krishnappa, San Jose, CA (US); Luke Wroblewski, San Jose, CA (US); Marco Boerries, Los Altos, CA (US); Joe Hayashi, Piedmont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 657 days.

(21) Appl. No.: 12/069,731

(22) Filed: Feb. 11, 2008

(65) Prior Publication Data
US 2009/0177744 A1 Jul. 9, 2009

Related U.S. Application Data

(60) Provisional application No. 61/019,215, filed on Jan. 4, 2008.

(51) Int. Cl.
*G06F 15/16* (2006.01)
*G06Q 10/10* (2012.01)
(52) U.S. Cl.
CPC ..................... *G06Q 10/10* (2013.01)
USPC ............ 709/204; 709/217; 705/319; 715/745
(58) Field of Classification Search
USPC .................... 709/204, 217; 705/319; 715/745
See application file for complete search history.

(56) References Cited

U.S. PATENT DOCUMENTS

| | | |
|---|---|---|
| 6,748,402 B1 * | 6/2004 | Reeves et al. ................... 1/1 |
| 2003/0167324 A1 | 9/2003 | Farnham et al. |
| 2004/0122855 A1 * | 6/2004 | Ruvolo et al. ............. 707/104.1 |
| 2004/0148275 A1 * | 7/2004 | Achlioptas ........................ 707/3 |
| 2005/0159970 A1 * | 7/2005 | Buyukkokten et al. ........... 705/1 |
| 2005/0171799 A1 * | 8/2005 | Hull et al. ........................ 705/1 |
| 2006/0026298 A1 | 2/2006 | Zeng et al. |
| 2006/0036692 A1 * | 2/2006 | Morinigo et al. ............. 709/206 |
| 2007/0192299 A1 * | 8/2007 | Zuckerberg et al. .............. 707/3 |
| 2007/0266097 A1 * | 11/2007 | Harik et al. .................... 709/204 |
| 2008/0040673 A1 * | 2/2008 | Zuckerberg et al. .......... 715/745 |
| 2008/0189122 A1 * | 8/2008 | Coletrane et al. ................. 705/1 |
| 2008/0288596 A1 * | 11/2008 | Smith et al. ................... 709/206 |
| 2009/0003662 A1 * | 1/2009 | Joseph et al. ................. 382/118 |

(Continued)

FOREIGN PATENT DOCUMENTS

KR 10-2000-0036287 7/2000

OTHER PUBLICATIONS

Notification of Transmittal of the International Search Report and the Written Opinion of the International Searching Authority, or the Declaration.

(Continued)

*Primary Examiner* — Thomas Dailey
(74) *Attorney, Agent, or Firm* — Weaver Austin Villeneuve & Sampson LLP

(57) ABSTRACT

Methods and apparatus are described for detecting social relationships across multiple networks and/or communication channels. These social relationships may then be utilized in a wide variety of ways to support and enhance a broad range of user services.

44 Claims, 25 Drawing Sheets

(56) References Cited

U.S. PATENT DOCUMENTS

2009/0030932 A1* 1/2009 Harik et al. .................. 707/102
2009/0043844 A1* 2/2009 Zimmet et al. ............... 709/204

OTHER PUBLICATIONS

About Spock, http://www.spock.com/about, 2 pages, printed on Jan. 3, 2008.

Chinese Office Action dated Mar. 21, 2012, CN Application No. 200880124053.7.

Korean Office Action dated Apr. 26, 2012, KR Application No. 2010-7017357.

CN patent application No. 200880124053, Office Action mailed Dec. 18, 2012.

CN patent application No. 200880124053, Office Action mailed Jun. 26, 2013.

\* cited by examiner

FIG. 1

Invite Connections from all your networks across the internet
Use the slider to adjust how many people to invite to your network

[ Invite Selected ]  [ Invite All ]  [ Ignore All ]

Invite
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
  email address
  ☐ home phone number
  ☐ mobile phone number
  ☐ piece of data
  ☐ piece of data
  Category: Family
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore
- ☒ 👤 First name Last name — Ignore

[ Invite Selected ]  [ Invite All ]  [ Ignore All ]

Refine List  Customize this
Closest to me ——————— All

Network created from these places
- Yahoo!
- GMail
- Facebook
- MySpace
- LinkedIn
- Bebo
- Twitter
- Yelp Reflect back to the user which networks and site are being aggregated Data record for potential contacts is closed by default and only presents First and Last name and a picture if applicable.

Record can be opened to reveal data collected from the various sources and allows user to see which places the person came from in the case of multiple sources

*FIG. 19*

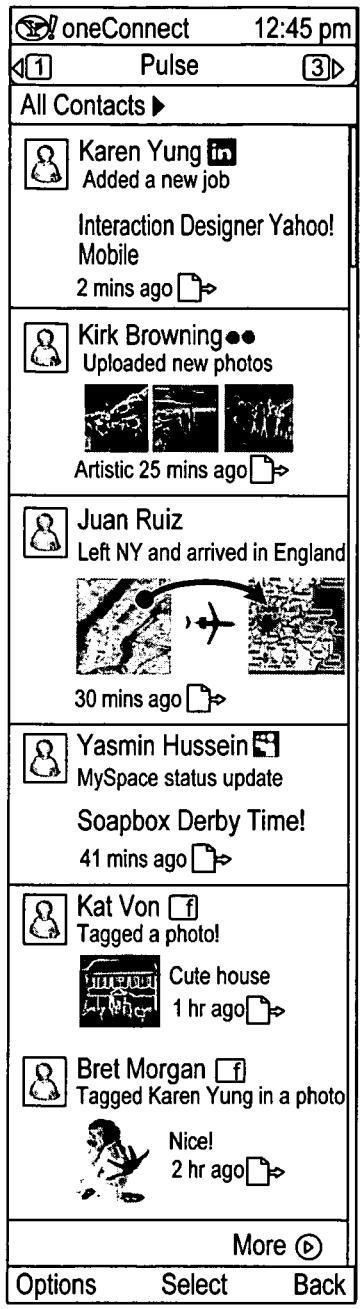 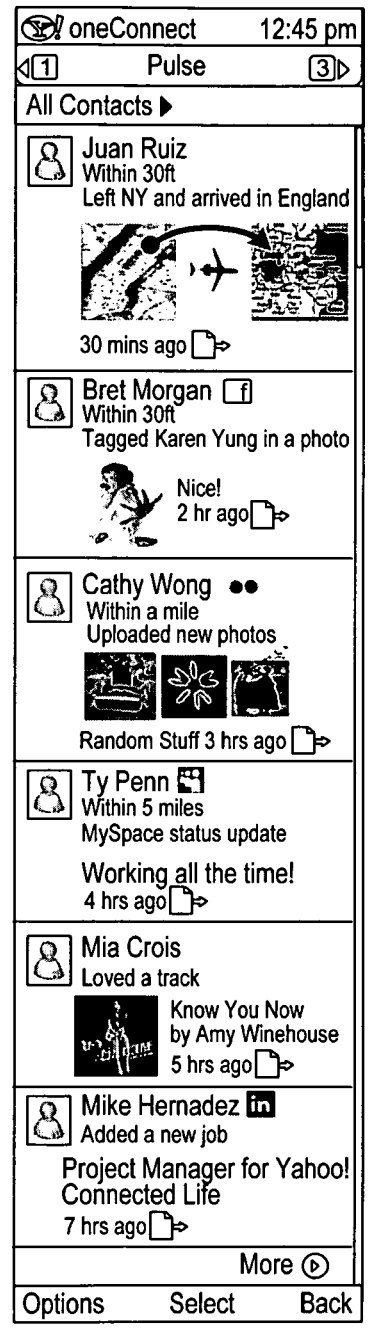
*FIG. 24A*  *FIG. 24B*

IDENTIFYING AND EMPLOYING SOCIAL NETWORK RELATIONSHIPS

RELATED APPLICATION DATA

The present application claims priority under 35 U.S.C. 119(e) to U.S. Provisional Patent Application No. 61/019,215 filed Jan. 4, 2008, the entire disclosure of which is incorporated herein by reference for all purposes.

BACKGROUND OF THE INVENTION

The present invention relates to social networks on the Web and, in particular, to techniques for aggregating social network data from multiple disparate sources.

Many users of the World Wide Web are members of multiple networks of users, each of which is typically controlled by a service provider which exercises exclusive control over its data, including data representing connections between its members. Examples of such networks include, for example, Yahoo!®, Facebook, MySpace, Flickr, LinkedIn, Twitter, etc. Given this state of affairs, there is typically a considerable amount of data representing the social network of a given user that is not apparent or available to each of the different service providers. As a result, neither the user nor the service providers are able to leverage the full potential of the user's social connections.

SUMMARY OF THE INVENTION

According to the present invention, techniques are provided by which social relationships of individuals are identified and leveraged to support a broad range of functionality. According to a specific embodiment, methods and apparatus are provided for identifying social relationships for a first user operating in a first network context controlled by a first entity. An identity of the first user is generated with reference to a first data source associated with the first network context and under control of the first entity, and at least one external data source outside of the first network context and not under control of the first entity. A plurality of contacts having a relationship with the first user are identified with reference to the first data source, the at least one external data source, and the identity of the first user. First ones of the contacts are not identifiable from the first data source. A relevancy measure is determined for each of the contacts which represents a relevance of the relationship between the first user and the contact. The relevancy measure for each contact is determined with reference to one or more of the first data source or the at least one external data source.

According to another specific embodiment, methods and apparatus are provided for identifying social relationships for a first user operating in a first network context controlled by a first entity. A plurality of contacts having a relationship with the first user is presented to the first user. The plurality of contacts were determined with reference to a first data source associated with the first network context and under control of the first entity, at least one external data source outside of the first network context and not under control of the first entity, and an identity of the first user. The identity was determined with reference to the first data source and the at least one external data source. First ones of the contacts are not identifiable from the first data source. The plurality of contacts is presented in accordance with a relevancy measure associated with each of the contacts which represents a relevance of the relationship between the first user and the associated contact. The relevancy measure for each contact was determined with reference to one or more of the first data source or the at least one external data source.

According to some embodiments, aggregation of vitality across multiple contexts is enabled. According to further embodiments, each external data source employs a permissioning model for controlling access to information associated with the external data source. The permissioning models for the various external data sources are aggregated thereby enabling access to the information associated with each external data source according to its corresponding permissioning model.

A further understanding of the nature and advantages of the present invention may be realized by reference to the remaining portions of the specification and the drawings.

BRIEF DESCRIPTION OF THE DRAWINGS

FIGS. 1-3 are screen shots illustrating a process flow in accordance with a specific embodiment of the invention.

FIGS. 19 and 20 are representations of interfaces which may be employed with embodiments of the invention.

FIGS. 21-25 are mobile screen shots illustrating a process flow in accordance with another specific embodiment of the invention.

DETAILED DESCRIPTION OF SPECIFIC EMBODIMENTS

Figure 2:
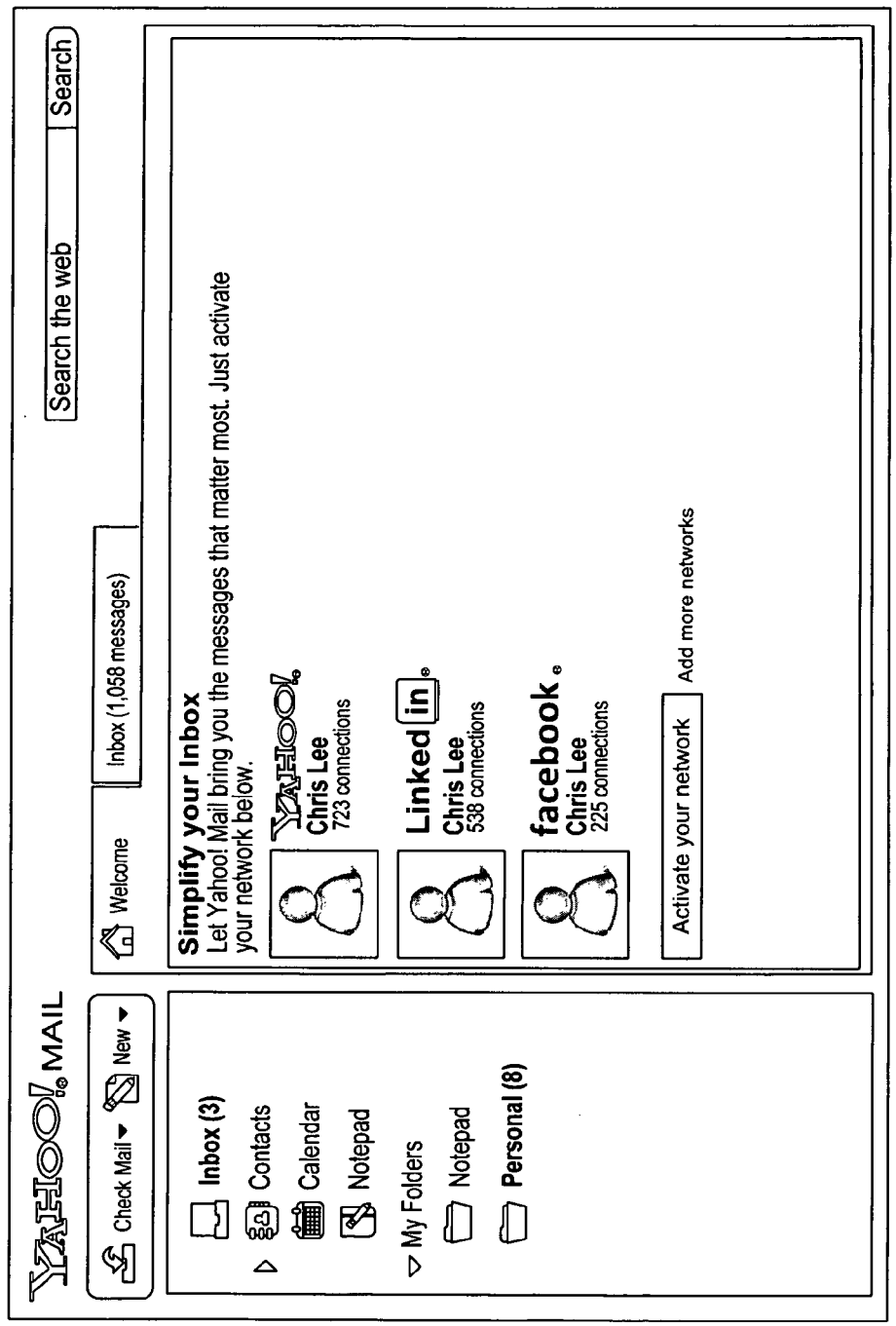

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the invention, methods and apparatus are provided which are operable to detect both manifest and latent social relationships for a given user across multiple networks or communication channels, e.g., social networks, portals, communication or messaging systems, etc. These social relationships may then be utilized in a wide variety of ways to support and/or enhance a broad range of user services.

Manifest relationships may be represented, for example, by explicit connections between the user and identities or identity tokens associated with other users (e.g., in address books, contacts lists, buddy lists, etc.). Latent relationship are, in general, less explicit and may be represented, for example, by communications patterns or mutual friend connections. Embodiments of the invention leverage both latent and manifest social relationships, and represent a shift away from a "network-centric" or "channel-centric" model of connection to a "person-centric" model that works across multiple social networks, and communication and vitality channels. As will be discussed, the various types of latent and manifest social relationships may be detected in a variety of ways.

In addition, embodiments of the invention enable the aggregation of vitality from a wide variety of sources. Vitality refers to events or actions (e.g., publication of content, changes in status, installation and use of applications, etc.) corresponding to a particular individual or group of individuals, e.g., what a user's contacts are doing on the Web. Vitality may be distinguished from messaging-type connections in that, for example, an email explicitly defines a group of recipients who have permission to read the email. By contrast, vitality is a broadcast form of communication based on user actions which has an implicit set of recipients defined by a graph of social relations. This graph of social relations may be labeled and/or subdivided according to categorical labels such as "friends", "family", "school", "work", and/or many other group or organization-based affiliation.

So, the "recipients" of an individual's vitality are defined a priori, and typically receive notifications of the publication of content as it occurs for which the recipients already have implicit permission to consume the content. Embodiments of the invention which enable the aggregation of vitality allow users to see vitality events (e.g., status text updates, photo uploads, application installs, etc.) associated with their contacts across networks and/or communication channels by leveraging existing permissions and privacy models of the various networks and/or channels to access, aggregate, and display the vitality.

Figure 1:
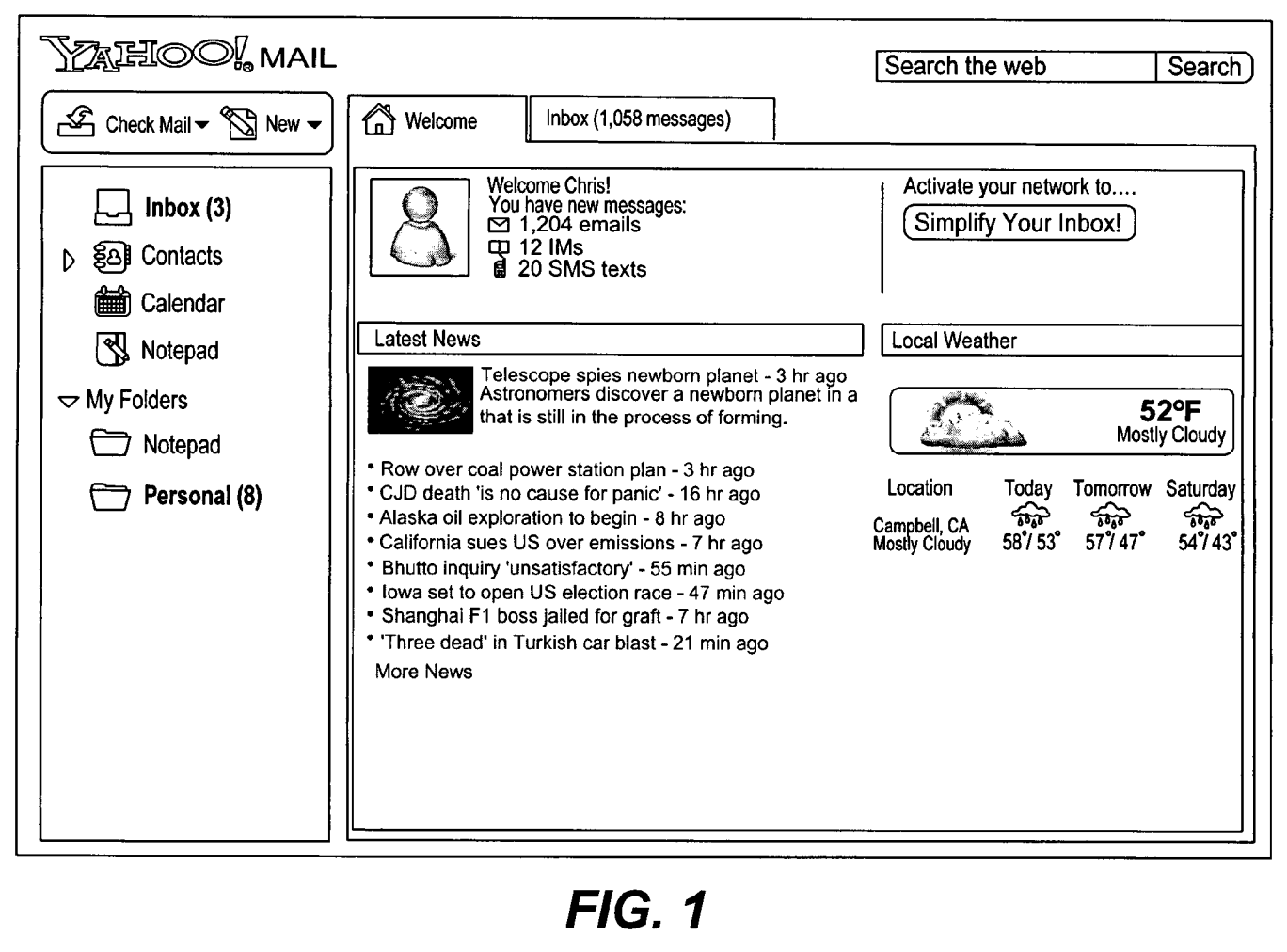

An example may be instructive. Two users might be explicitly connected in the Yahoo!® network in that they email each other using Yahoo!® mail. The same two users might also have several other connections, e.g., Flickr contacts, Facebook friends, Twitter followers, LinkedIn connections, etc., some of which may be characterized as manifest, and some of which may be characterized as latent. When one of the users initiates the Connections Activator (e.g., using the "Simplify Your Inbox!" button in FIG. 1), the Connections Activator first determines who the initiating user is. According to one set of embodiments, this is done by searching the current network context, e.g., the Yahoo!® network (and in particular utilizing the logged-in identity of the user on the Yahoo! network), as well as potentially leveraging the broader Web context (possibly some specified set of networks or properties on the Web), and gathering data by which the user may be identified, e.g., user profiles, pages and vitality produced on the current and other networks, etc.; any token of information which can be used to identify the user.

The identity of the user may also be determined, at least in part, by requesting input from the user himself. This may include asking the user to specifically identify other networks, other properties in the current network, or other systems to which the user belongs or on which the user is represented in some way. The various data are then consolidated into a representation of the user. This may be presented to the user as shown, for example, in the Yahoo!® Mail interface of FIG. 2.

Once the user has been identified, the next phase of activation may be initiated (e.g., using the "Activate your network" button in FIG. 2) during which the Connections Activator searches for and gathers data relating to others with whom the user interacts (on the current network, other properties on the current network, other networks or systems on the Web, etc.). These other individuals may be identified, for example, from communication patterns of the user, relationships with the user in the current context and other networks, address books, contact lists, vitality consumed by the user, etc. These data are then consolidated into representations of the people with whom the user has relationships.

In some cases, a determination may need to be made as to whether identities or identity tokens in different networks correspond to the same person and, if so, whether those identities should be consolidated into a representation of a single person or "de-duplicated." This might occur, for example, in situations in which a person uses different names in different networks. Consolidation may be automatic, manual (e.g., with input from the user), or semiautomatic in which the system and the user can interleave actions in the de-duplication process leveraging feedback from each other in the process. This de-duplication may be done by comparing identity tokens such as, for example, names, email addresses, phone numbers, etc.

According to various embodiments, the gathering of data may be accomplished using a variety of techniques. For example, a data repository in the current network may have user profile data about the user, while another has a first name, last name, and email address of a contact. A repository in another network might have the first name and last name of that contact with other information, e.g., a phone number or a web page URL. Yet another repository in that other network might have additional information relating to the user himself. Each additional piece of information or token relating to the user can be added to the user's identity and used to identify other relevant information about the user and his relations to others. Similarly, each additional piece of information or token relating to other users may be used to augment their respective identities and to inform the construction of the social graph connecting them with the user.

The manner in which in which such information is extracted may also vary considerably depending on a variety of factors. For example, the operator of the current network context obviously has direct and consistent access to the data repositories associated with that network. However, the nature of access to information on other networks may vary significantly depending on the relationships between the networks and/or the openness of the operators of the other networks. In some cases, a commercial relationship with an operator of another network may provide direct access to that network's data, or some more restricted level of access to the network, e.g., API level access. In other circumstances, e.g., where no relationship exists, techniques such as screen scraping, image recognition, and reverse optical character recognition may need to be used. Combinations of these approaches may also be employed.

According to some embodiments, the individuals having relationships with a given user are prioritized, ranked, or sorted with reference to the relevance of the contact to the user, e.g., the closeness or intensity of the relationship, the type of relationship, or a group to which the individuals belong. These may be determined with reference to a wide variety of information including, for example, the recency, frequency, volume, and/or periodicity of communications between the individuals, the number of connections in different networks or properties, the type of networks in which the users are connected, the type of relationship (see below), etc.

Figure 3:
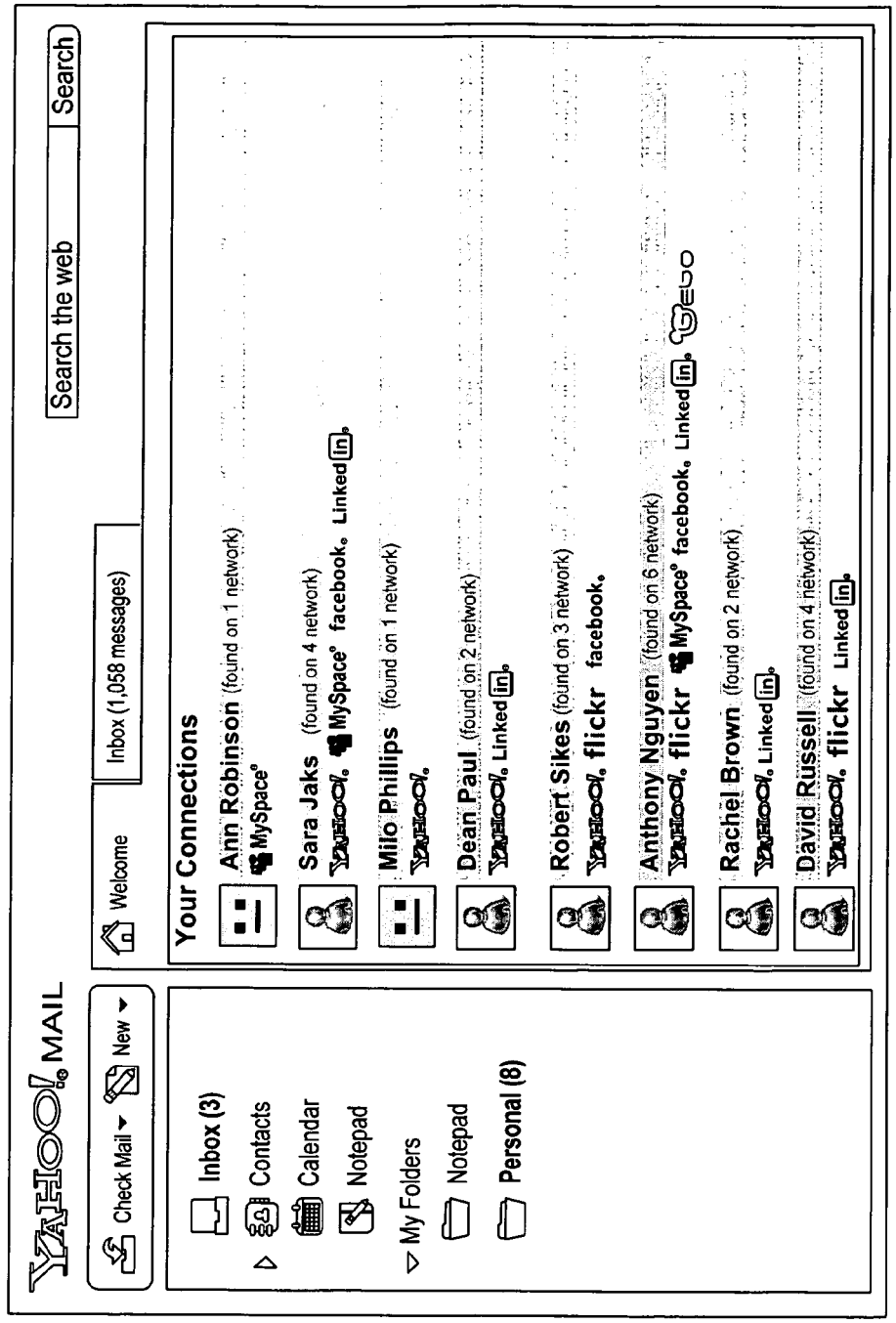

Once a relationship is detected (and possibly classified and/or consolidated), the relationship may also be confirmed. This may involve an explicit invitation to confirm the relationship sent to the user and/or the other person in the relationship. In one example, this may take the form of a list of people with whom the user has relationships (possibly sorted as described above) returned to the user for confirmation of each (see FIG. 3). According to some embodiments, the knowledge of the relationships may be utilized without confirmation.

According to some embodiments, the Connections Activator utilizes a variety of information about the people corresponding to detected relationships and their interactions to determine that they have a relationship of a given type. Such information might include, for example, the nature and content of communications between the people, relationships they have with each other and other users on other networks (e.g., MySpace, Facebook, LinkedIn), demographic information, etc. For example, a detected relationship may be classified as family, friend, acquaintance, business associate, etc., based on inferences from both the static data (e.g., contact information) as well as dynamic data (e.g., communication patterns).

According to various embodiments, the Connections Activator builds a model of an implicit community of relations between human beings by mining the data about their extant relationships and communication patterns in other networks. This model, which in some embodiments is represented by a stack rank or grouping of human beings in relation to a given user, may then be used for a wide variety of purposes.

For example, knowledge of such relationships may be used to aggregate vitality. That is, by identifying relationships in other networks, and by determining that multiple identities correspond to the same individual, embodiments of the present invention may be used to aggregate vitality produced by a particular individual across multiple networks. This is to be contrasted with the current state of affairs in which, in order to consume vitality produced by their friends in different networks, users must traverse all of the different networks.

According to specific embodiments, aggregation of vitality is enabled by the aggregation of the permissioning models associated with the various sources of vitality. That is, sources of vitality such as social networks employ different models for enabling or restricting access to their users' content and information. Some employ relatively open models in which all or most members have access to some or all of the content and information of other network members. Some employ more restrictive models in which a member may limit access to specifically identified individuals, groups, or types of relations. When a user provides the Connections Activator with the requisite information for each of the networks or systems with which the user interacts, the Connections Activator is able to gain access to those networks and systems, and the content and information in those networks and systems, according to the permissioning model associated with each. By then recognizing that an individual with whom the user has contact in one context is the same person as an identity in another context, the Connections Activator is able to aggregate the vitality of that individual for the user regardless of the fact that the permissioning models in the different contexts may be radically different. Thus, according to specific embodiments, the Connections Activator enabled by the present invention effectively provides a single access control to content and information in a number of different contexts while preserving the permissioning models of each.

According to some embodiments, information relating to social connections and relationships may be used to weight other types of behaviors on a network. That is, understanding to whom a user is related, and possibly the nature and intensity of the relationship as well, can enable a wide variety of functionality.

Figure 12:
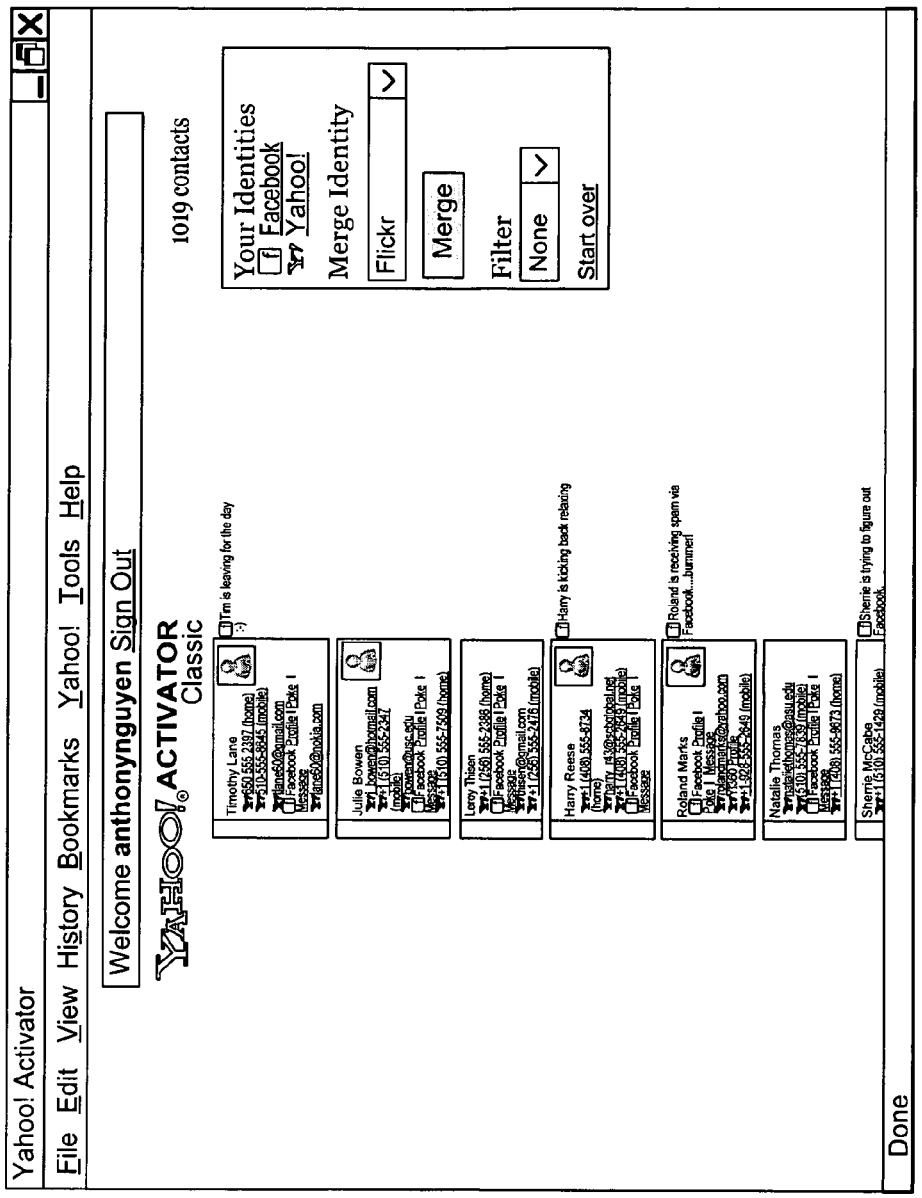
Figure 13:
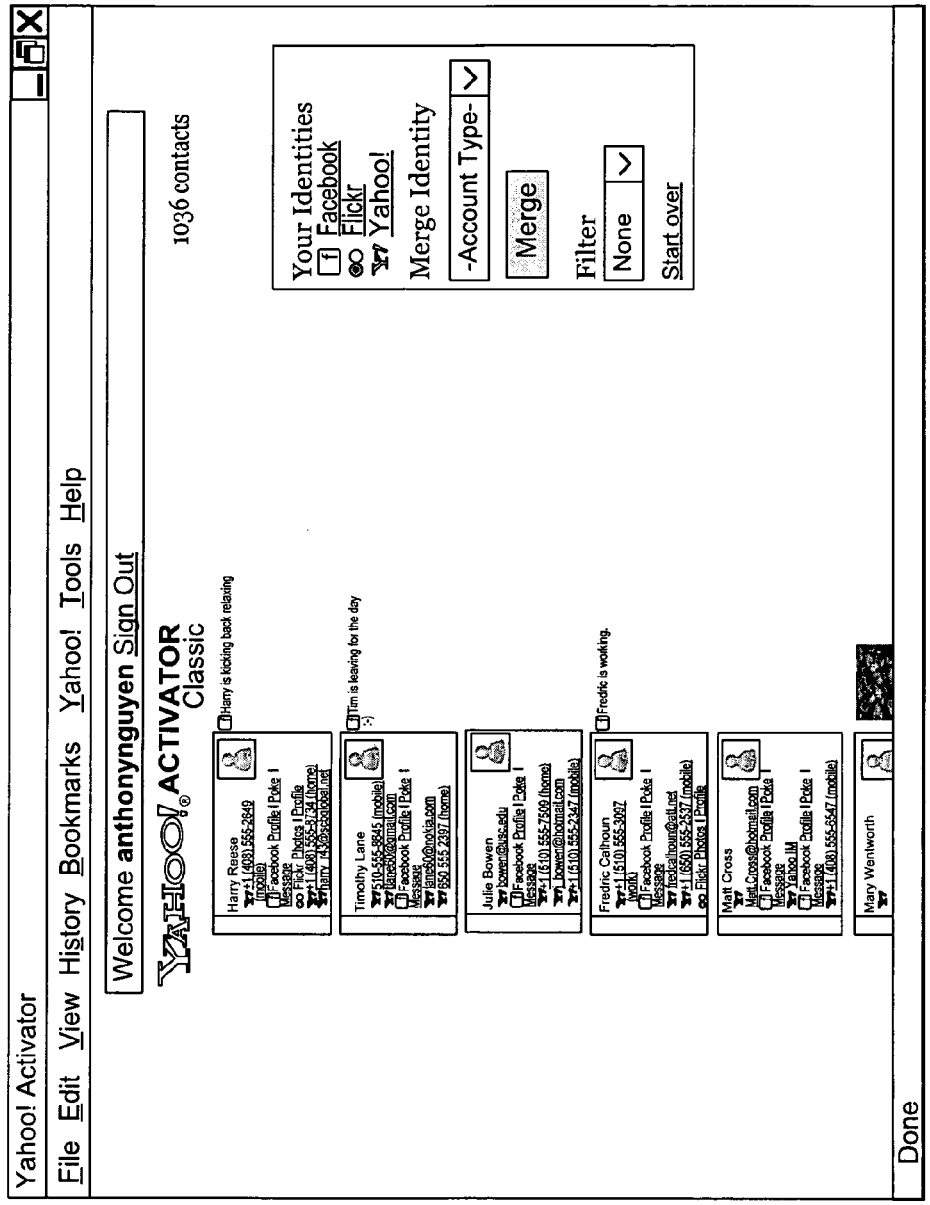
Figure 14:
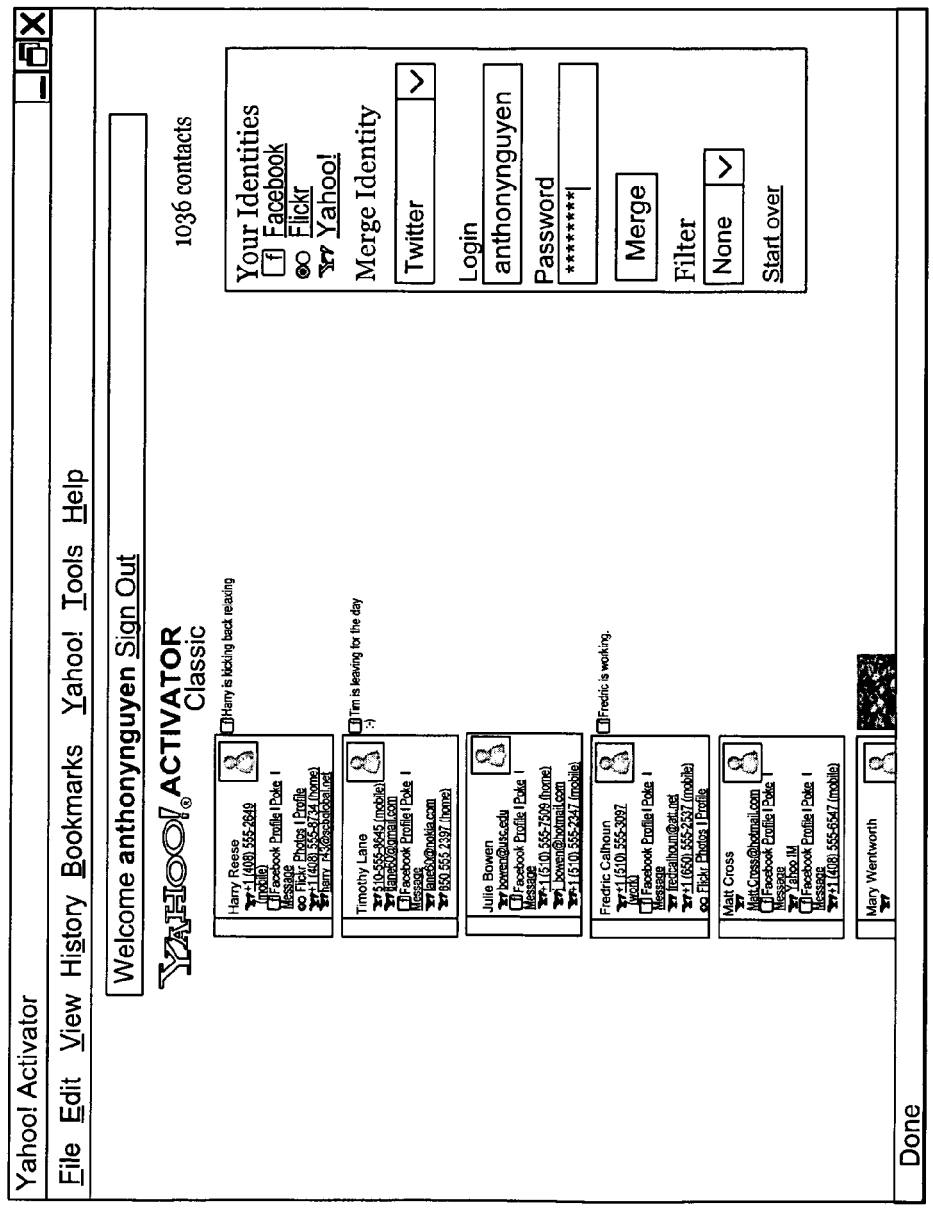
Figure 15:
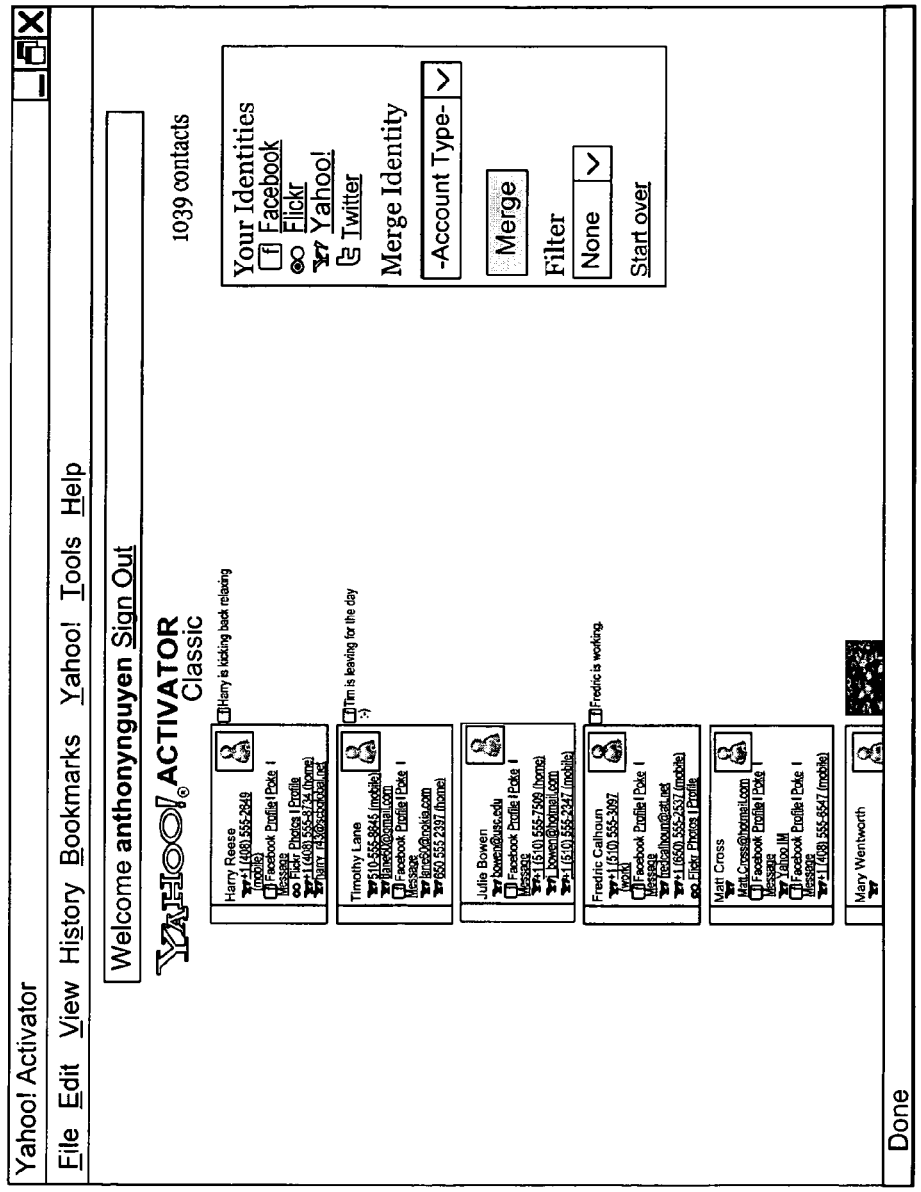

For example, such information might be used to order, filter, or emphasize messages in an inbox, e.g., presenting emails or other communications types (e.g., voice mail, SMS, IM messages, etc.) in order from people with whom the user communicates most to people with whom the user communicates least. In another example, incoming messages could be assigned various levels of priority based on the closeness and/or type of the similar updating occurs with reference to Flickr (FIGS. 12 and 13), and then Twitter (FIGS. 14 and 15). In this way, the source user "declares" membership in the various networks and/or communication channels and the system links these various identity tokens of the source user together, thereby enabling the aggregation and/or consolidating of the source user's contacts from various contexts, the grouping and/or ranking of those contacts, as well as the aggregation of vitality and other forms of communications.

Figure 16:
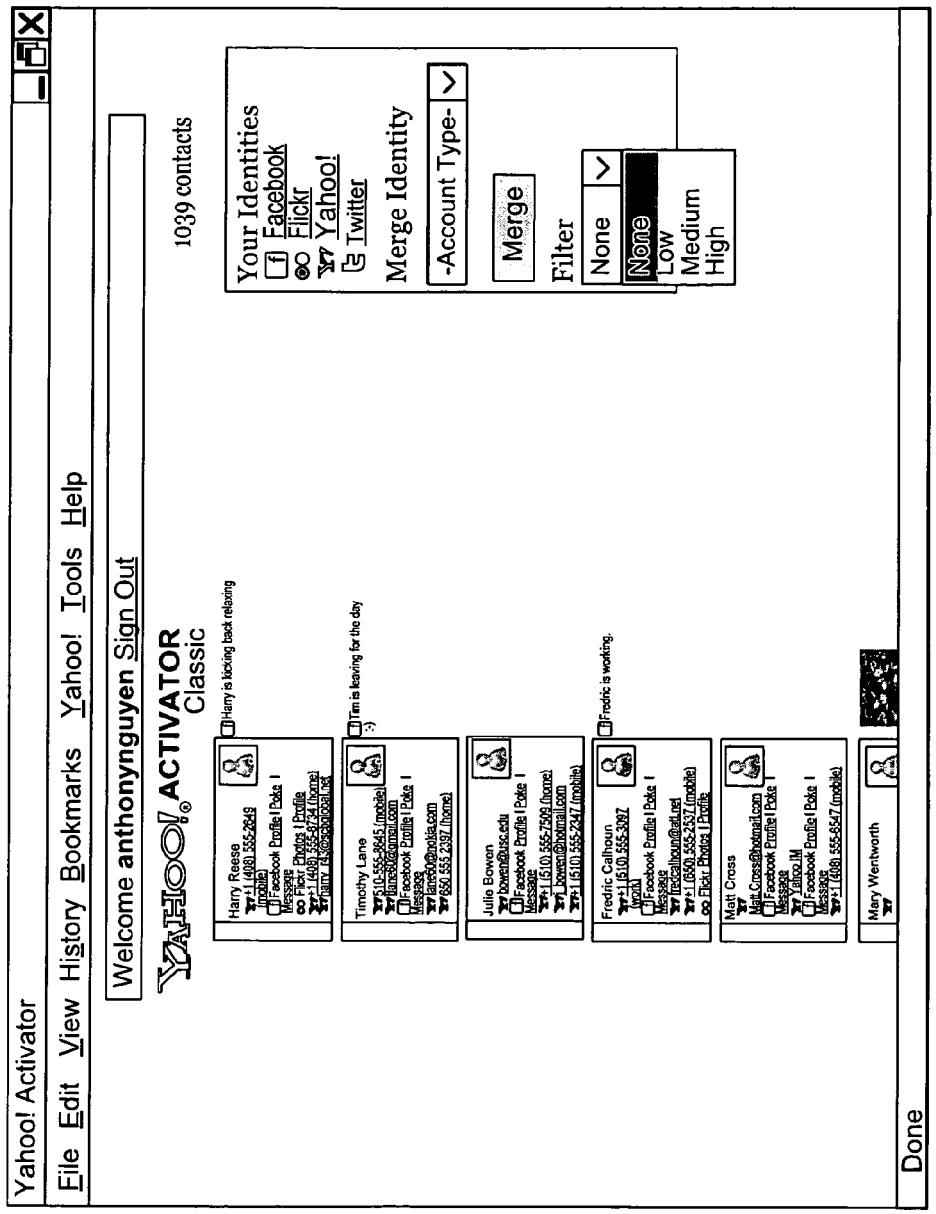
Figure 17:
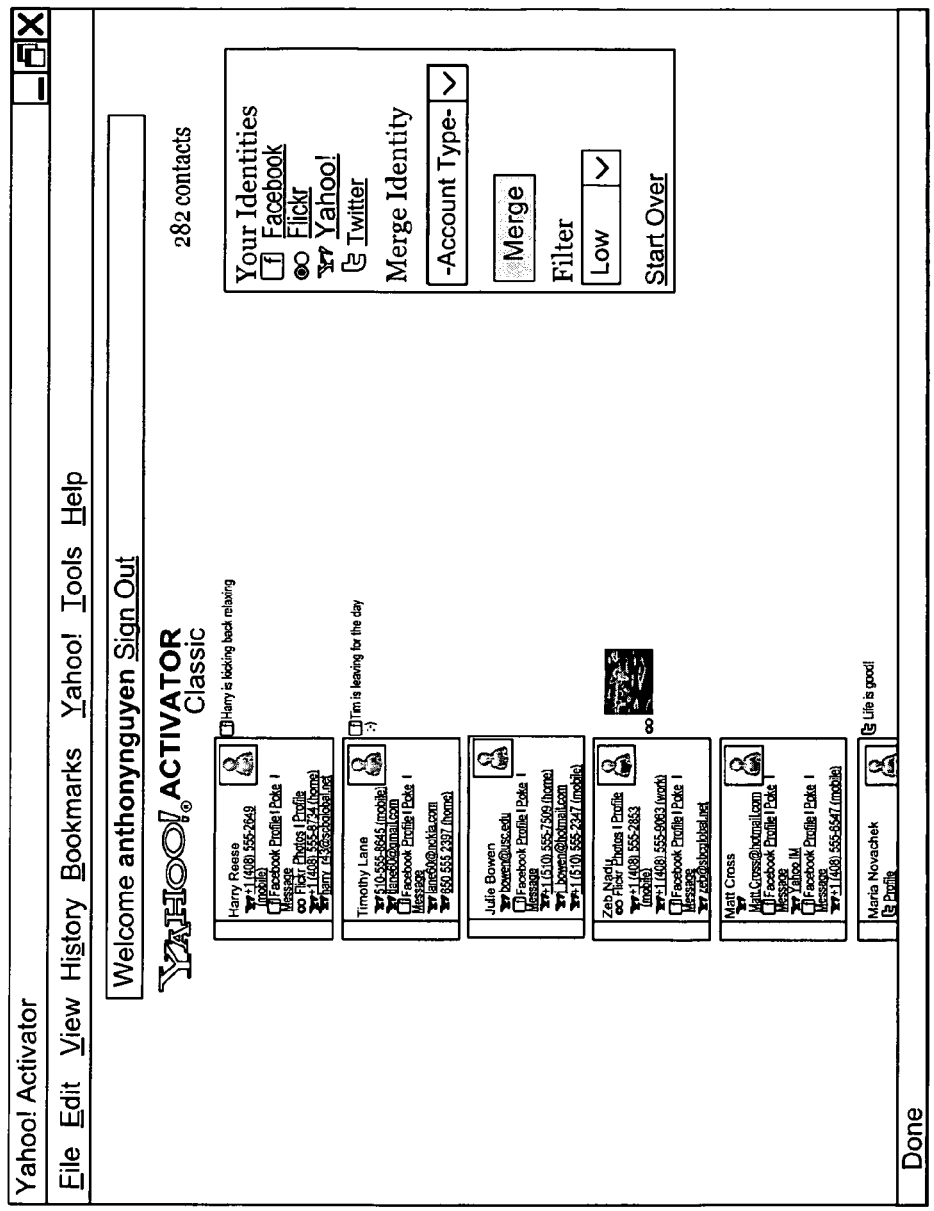
Figure 18:
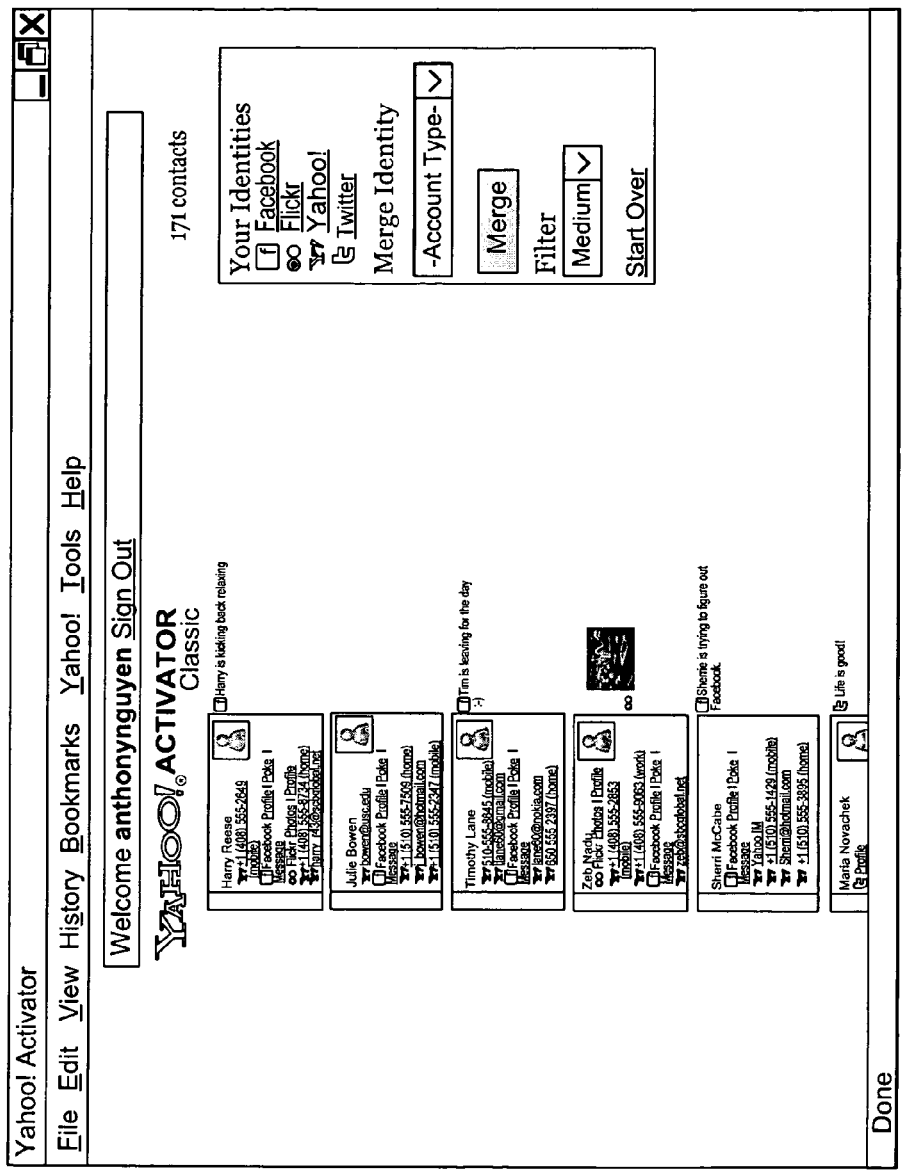

FIGS. 16, 17, and 18 show the effects of the source user imposing different levels of filtering on the contacts list (i.e., from "none" to "low" to "medium" to "high") which has the effect of reducing the number of contacts in the list. As discussed elsewhere herein, such filtering may be done with reference to the degree of closeness or the intensity of the relationship and/or communication activity between the source user and each of the contacts.

Connections activation may occur in a variety of contexts according to various embodiments of the invention. One example is discussed above in which a user initiates the Connections Activator in the context of Yahoo!® Mail. However, it should be understood that this is merely one context in which connections activation may be useful. Other examples include virtually any messaging context, e.g., email, voice messaging, instant messaging, SMS, etc. According to a specific embodiment, it can be determined for any given communication channel whether a user has taken advantage of the Connections Activator to identify social relationships which might be used to enhance services in that channel. Further, relationships identified in other communication channels and/or network contexts may be leveraged to "activate" a new channel or context given the high probability of substantial overlap in the relationships between the different contexts. So, for example, if a user joins a new social networking site, the process of identifying people on the site with whom the user might want to connect can be facilitated using the present invention to identify relationships from other contexts which could be established in the new context.

In addition, the consolidated identities of the people with whom a user is associated can be leveraged to "fill the holes" in the contact information or address books of the user. For example, if the user's email address book has only the email address of a particular contact, additional identity tokens from that contact's consolidated identity (e.g., phone numbers, addresses, screen names, etc.) could be used to fill out other fields in the address book entry.

According to various embodiments, the Connections Activator creates an articulated graph of connections between people with weights and types connected to user actions in relation to content objects that are trackable. This connections graph can then be used as a filter in a variety of contexts including, for example, vitality generation and consumption, messaging, content consumption, content forwarding, etc.

From a set of latent and manifest relationships, the Connections Activator creates a manifest graph of relationships, and iteratively refines and improves it over time to evolve a model of who the user is, who the user is connected to, how the user relates to those connections, and the types of transactions associated with those relationships.

Figure 4:
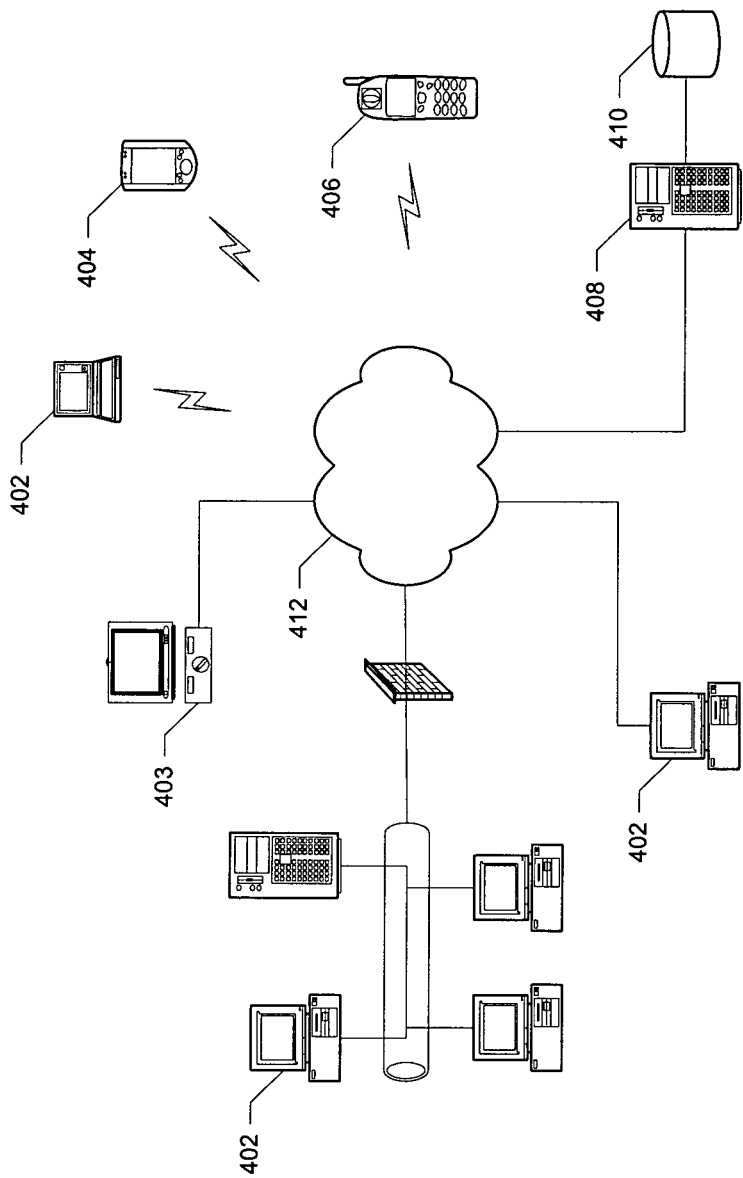
FIG. 4 is a simplified network diagram illustrating a computing context in which embodiments of the invention may be implemented.
Figure 5:
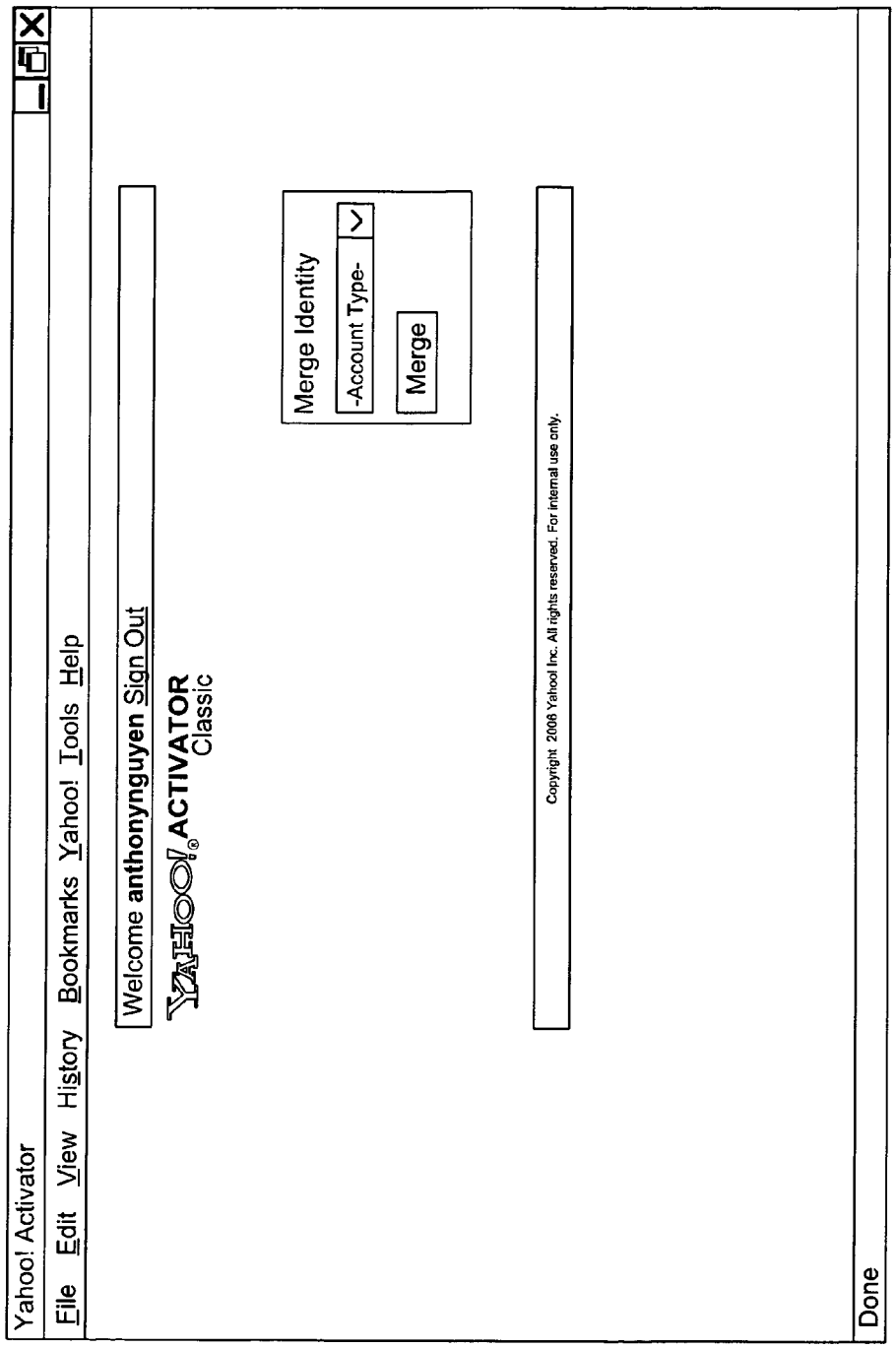
FIGS. 5-18 are screen shots illustrating a process flow in accordance with a specific embodiment of the invention.
Figure 6:
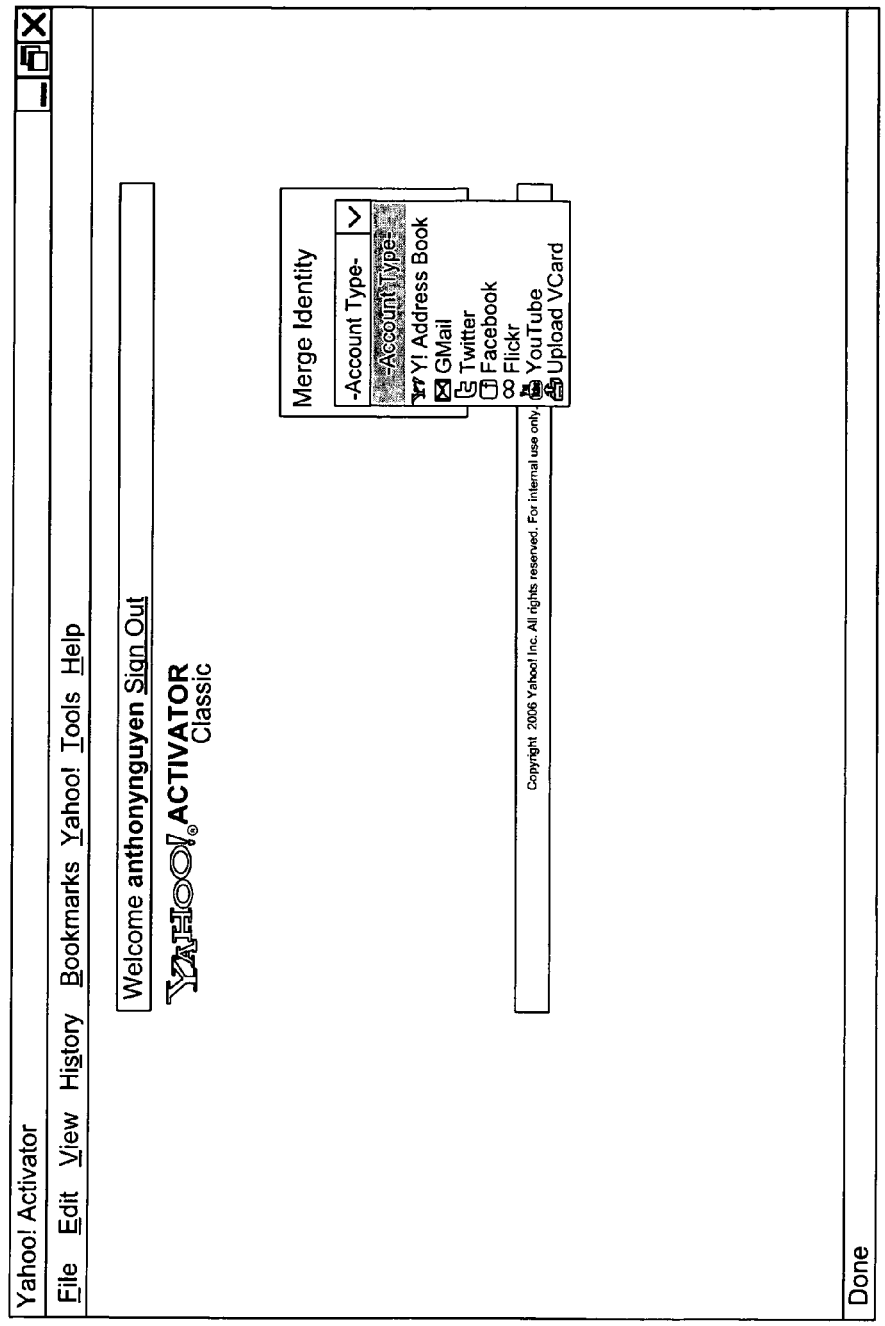
Figure 7:
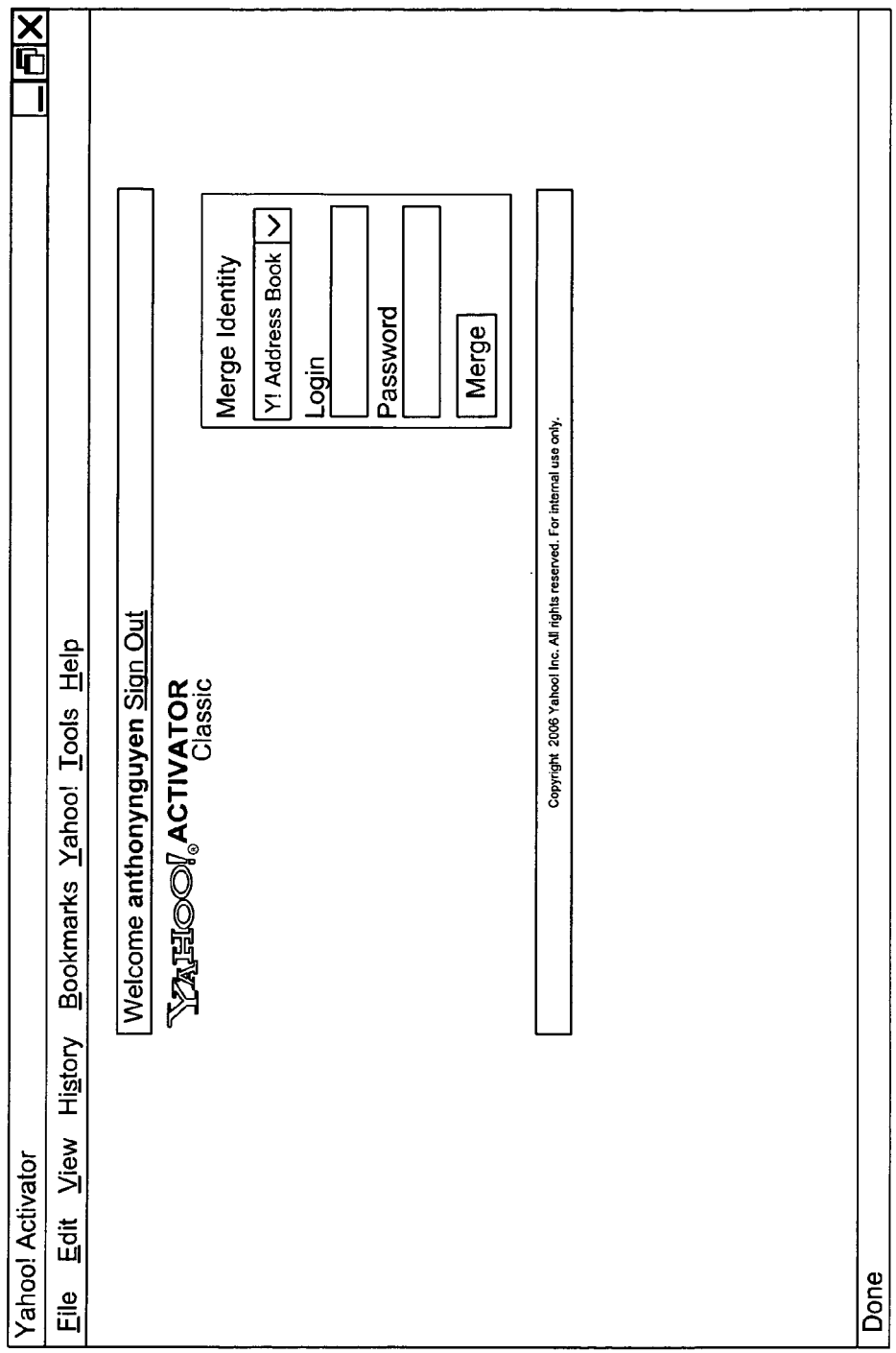
Figure 8:
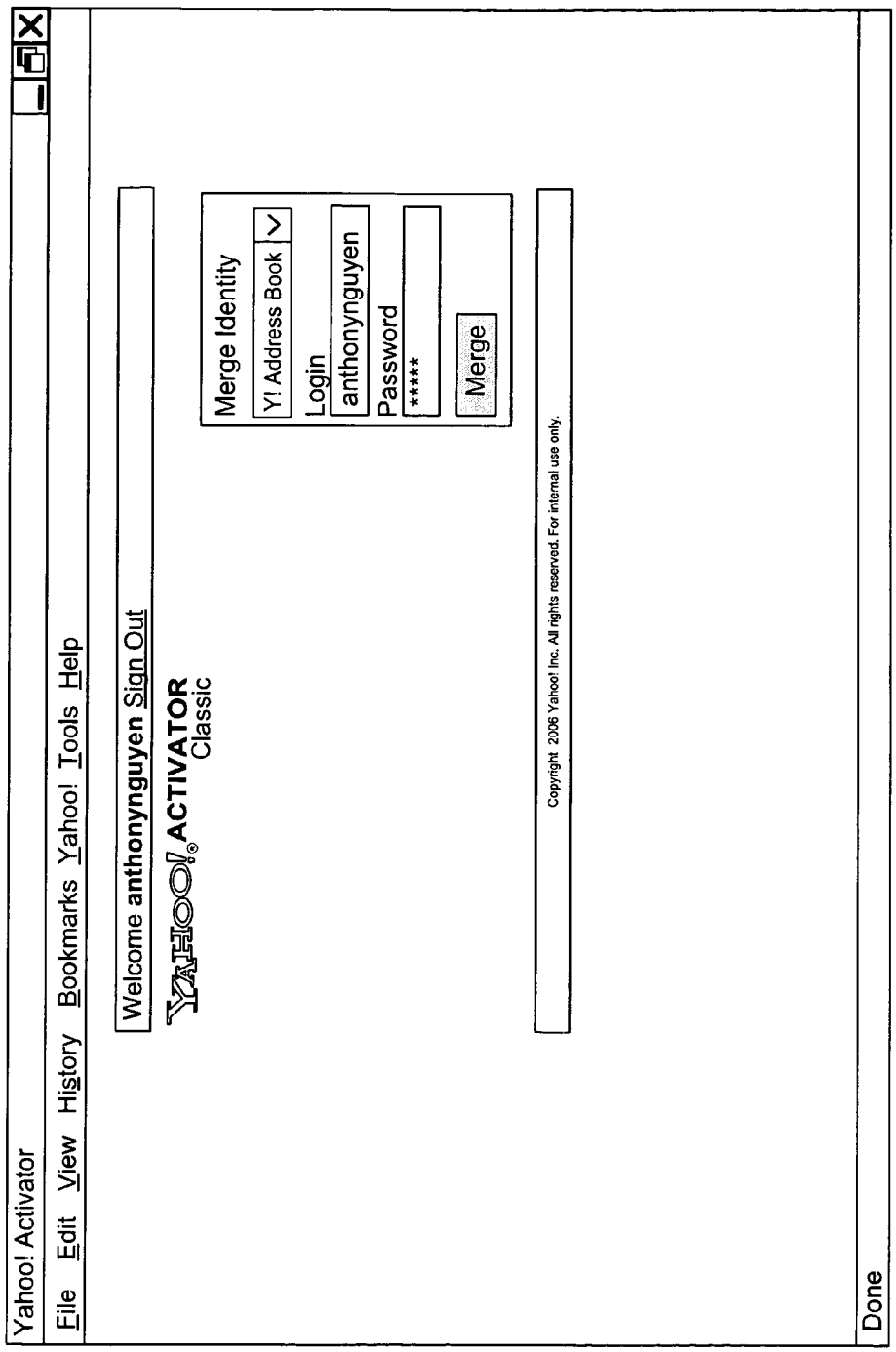
Figure 9:
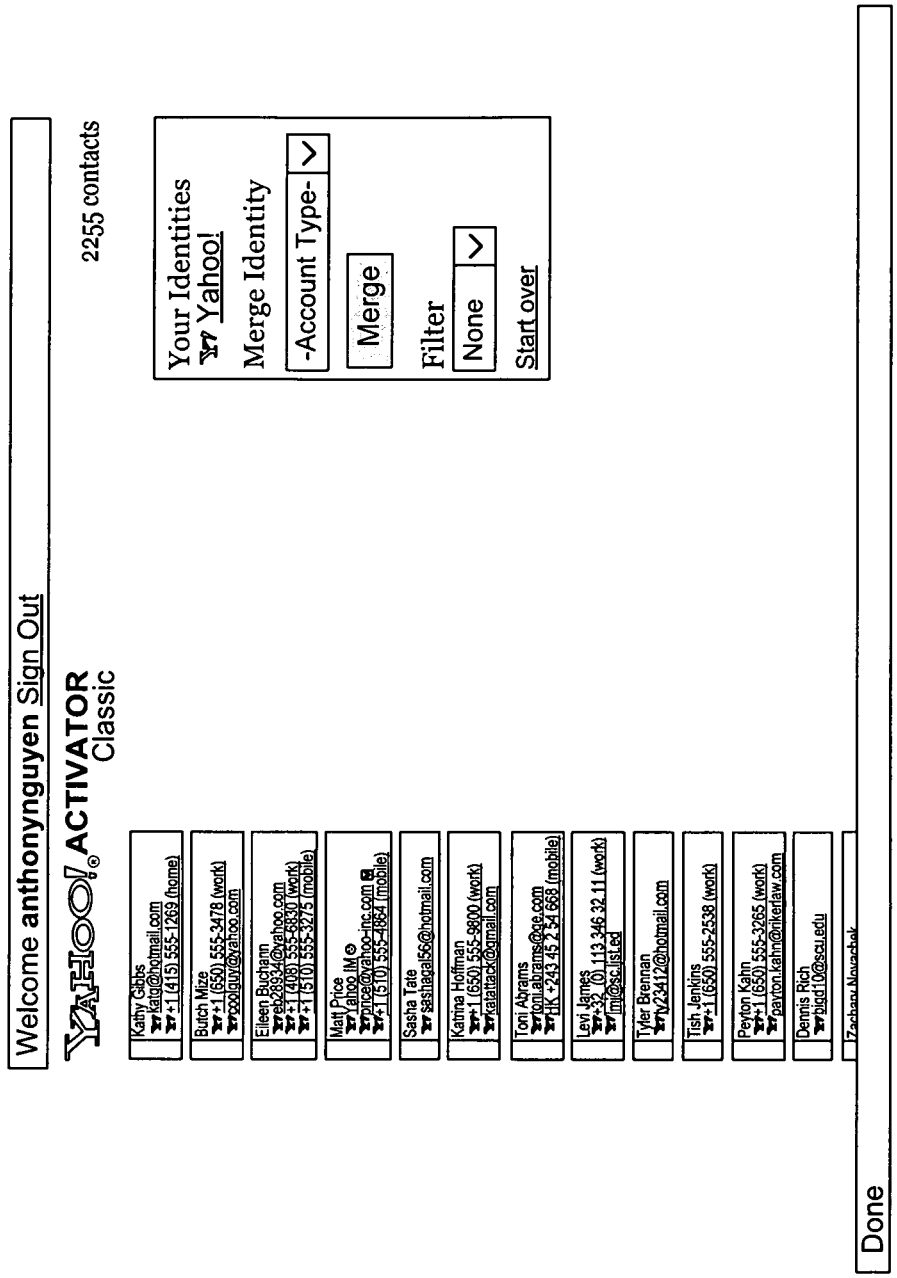
Figure 10:
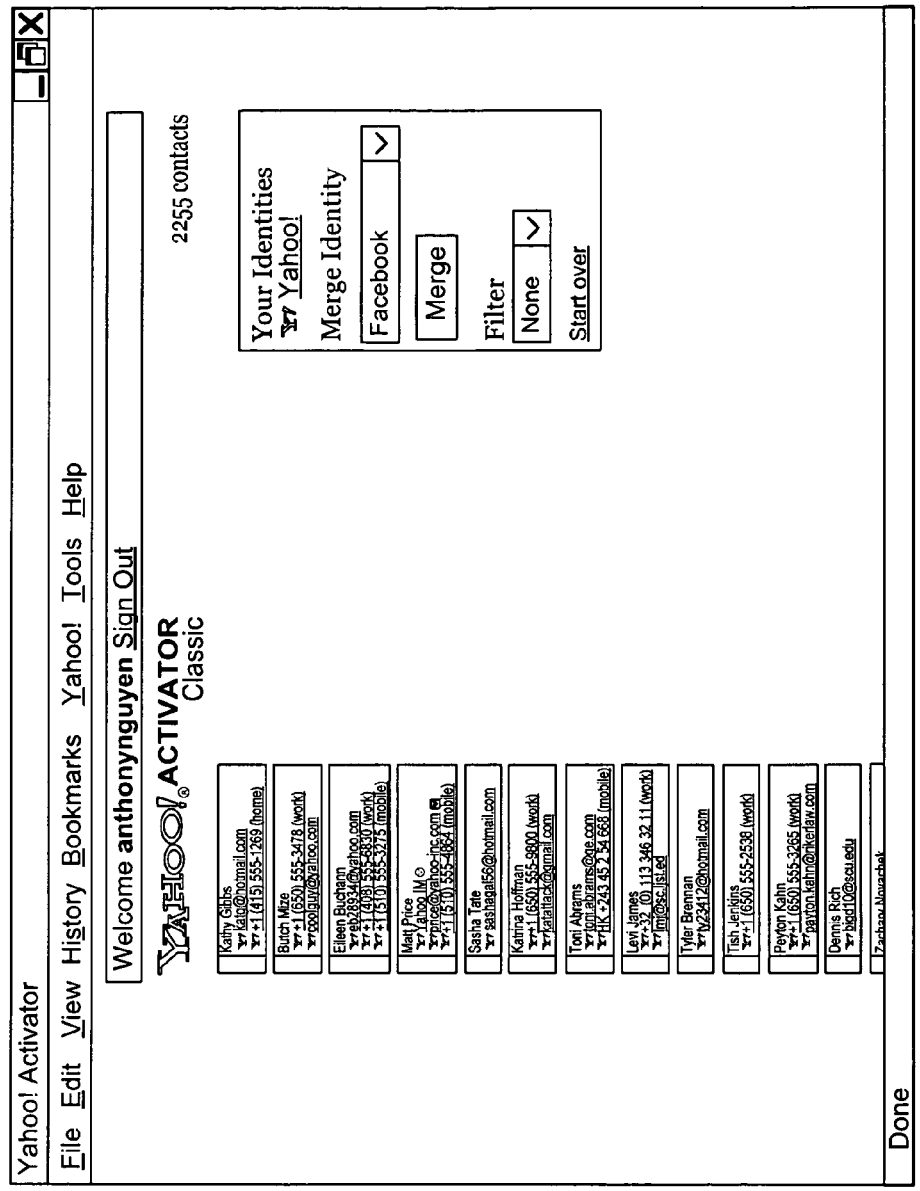
Figure 11:
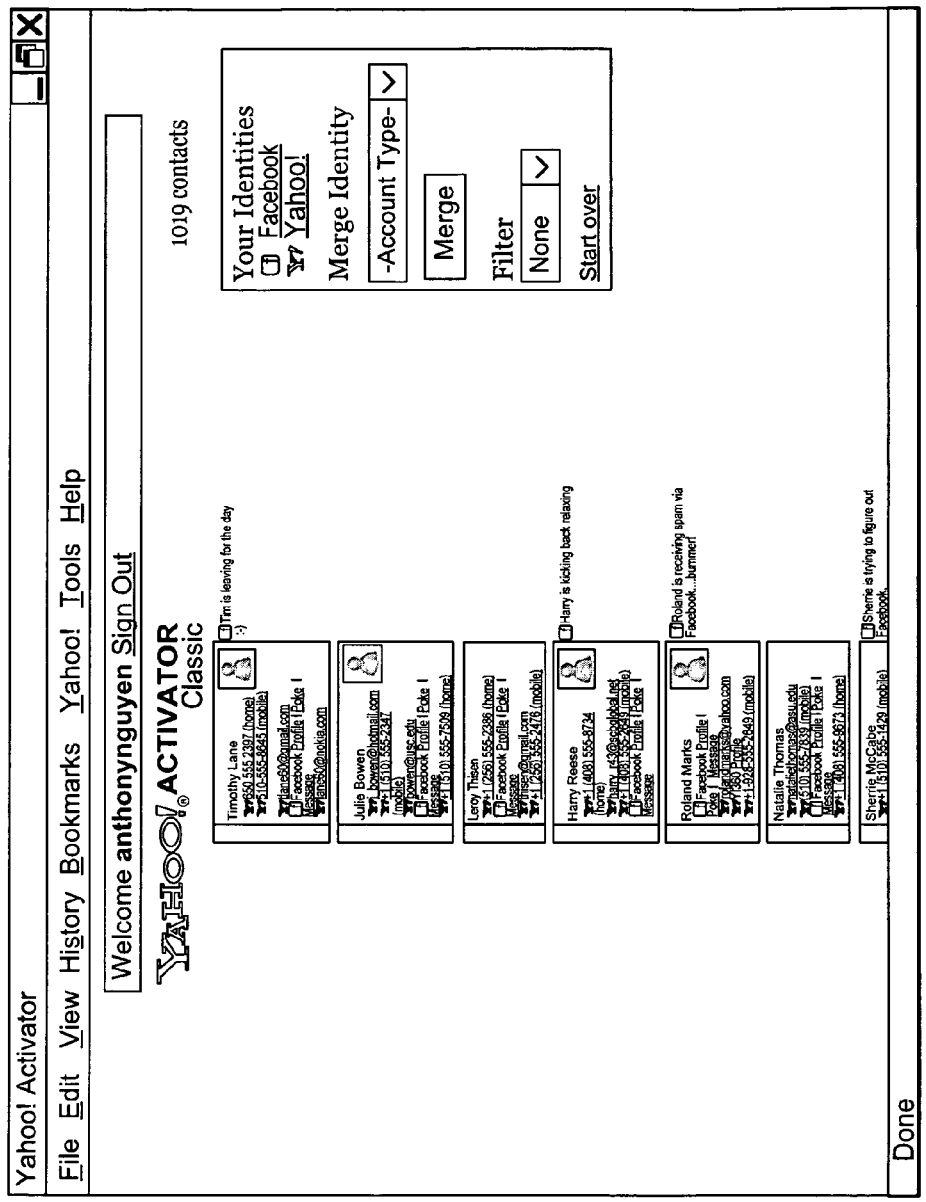

Embodiments of the present invention may be employed to identify and exploit social relationships and related data in any of a wide variety of computing contexts. For example, as illustrated in FIG. 4, implementations are contemplated in which the relevant population of users interact with a diverse network environment via any type of computer (e.g., desktop, laptop, tablet, etc.) 402, media computing platforms 403 (e.g., cable and satellite set top boxes and digital video recorders), handheld computing devices (e.g., PDAs) 404, cell phones 406, or any other type of computing or communication platform.

And according to various embodiments, user data processed in accordance with the invention may be collected using a wide variety of techniques. For example, collection of data representing a user's interaction with a web site or web-based application or service (e.g., the number of page views) may be accomplished using any of a variety of well known mechanisms for recording a user's online behavior. User data may be mined directly or indirectly, or inferred from data sets associated with any network or communication system on the Internet. And notwithstanding these examples, it should be understood that such methods of data collection are merely exemplary and that user data may be collected in many ways.

Once collected, the user data may be processed in some centralized manner. This is represented in FIG. 4 by server 408 and data store 410 which, as will be understood, may correspond to multiple distributed devices and data stores. The invention may also be practiced in a wide variety of network environments including, for example, TCP/IP-based networks, telecommunications networks, wireless networks, etc. These networks, as well as the various social networking sites and communication systems from which connection data may be aggregated according to the invention are represented by network 412.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Some of the characteristics of an example implementation in the context of the Yahoo!® network will now be described. At least some of the features and functionalities described below may be understood with reference to FIGS. 5-18 mentioned above, as well as FIGS. 19 and 20. According to this implementation, the user's data on the Yahoo!® network are mined to provide related services such as, for example, making recommendations on other users with which the user may be interested in connecting, or providing an easy way to populate the user's address book based on his aggregated contact list. This implementation takes advantage of the rich data that the user has in multiple places at Yahoo!® as well as outside the Yahoo!® network.

As discussed above, the Connections Activator of this implementation is operable to de-duplicate data around a contact even if it is from different sources. Examples of unique identifiers that indicate the same person are email address, cell phone number, home phone number, and first name+last name. Since the list for most users is relatively small, the risk of mistakes is acceptable and can be easily corrected by the user.

In determining a ranking for each relationship, various aspects of each relationship may be given different weights. For example, two-way relationships may be given a higher weight than one-way relationships. Contacts with similar attributes, e.g., same last name, university name, etc., may also be weighted more heavily. In addition, if an identity token (e.g., an email id or cell phone number) in the user's address book belongs to a known user in the network, then the known user's data may be leveraged to consolidate other identifiers for that user.

The goal is to generate a list of contacts—where possible getting the contacts directly (e.g., from the user's address book, Yahoo!® Messenger buddy list, etc.), but also mining other sources to augment the contact list, e.g., the user's email store as well as external sources. These aggregated data are normalized by giving rarer data higher weight. For example, if someone is using an address book they will likely have all the mobile number fields for all their contacts, so the weight associated with a mobile number may go down for that user.

Weights may be defined at a global level, but in some cases it may be advisable to allow different emphases for different sets of users to reflect their specific needs. For instance, in some emerging markets, mobile phones are more popular than land lines so the weights for mobile numbers in such markets may be deemphasized. According to a specific embodiment, the attributes which are weighted are presented to the user on a slider control (or the equivalent) along with the default weights. The user can then move the slider around and change the weights and the contact list refreshes with the new weights. When the user is done, these weights may be saved as specific to the user.

Machine learning may be incorporated at either or both of the user level and the system level. For example, the system may be configured to learn based on the contacts that a user accepts or rejects, and the categories that the user accepts, renames or changes.

Each contact recommended may include summary info (e.g., consolidated from all sources) and controls for taking action with respect to each (e.g., "Invite," "Reject," or "Later" buttons). The user may be enabled to accept all, reject all, and customize in between. The "Invite" button triggers an invite flow. The "Reject" button results in the contact being excluded from being shown as a recommendation in the future. The "Later" button allows the contact to be recommended again (assuming it meets the standard relevancy criteria).

This implementation of the Connections Activator may run periodically (with a configurable period), refreshing information from on and off Yahoo!® sites, and updating the relevance. Communication feeds (e.g., from mail providers and Messenger logs) may be employed to improve accuracy.

On either a user activated import, or a behind-the-scenes periodic import, this implementation of the Connections Activator retrieves data from the set of internal and/or external networks and/or systems identified or associated with the user. The Connections Activator then requests from an authentication system the appropriate set of third party credentials, which may or may not be persistently stored.

For a source user, i.e., the user initiating the import, who is identified from a globally unique identifier (GUID), the Yahoo!® internal contact lists is imported, as well as the authenticated third party contact lists that the user has approved for import. After import, certain lists can be made available to the user's address book if the user has selected that option.

The Global Contact List is an ordered list of contacts for a given source user identified via GUID. The targets in the contact list are not necessarily GUID-based, each entry including a set of identifiers that are guessed and/or confirmed to be the same entity if multiple identifiers exists for that entry. Best guesses are applied to non-registered users in order to de-duplicate them from information offered only in the source user's data, e.g., two imported entries having the same email addresses. The GUID database may be consulted to support de-duplication by identifying relationships that may not be inferable from best guess analysis (e.g., matching email address, cell phone number, first name, last name, etc.).

The import operation may be rerun to refresh the contact list. If at some point, the source user decides to opt out of a particular network or system, references to that integration source are removed from the global contact list on a subsequent import.

As discussed above, a set of weights is associated with each contact, and a total weight for the contact is calculated. Each integration source has a positive or negative weight associated with it. A high positive indicates a strong relationship, and negative indicates a weak relationship. The total weight is computed by summing all of the contributing weights for each entry. Weights are higher for entries that come from multiple integration sources, but each integration source might contribute to the weight differently.

A suggested contact list based on the de-duped and ranked global contact list is returned to the user for activation. The suggested contact list might be derived, for example, by subtracting entries from the global contact list for which the source user has already taken action, e.g., entries which are already in a two-way connection set, entries which were previously invited but either were denied or are still pending, etc.

From the suggested contact list, the source user generates a mesh of a set of targets which may or may not be registered in the Yahoo!® network. This may be accomplished, for example, by the source user marking a checkbox associated with each entry to indicate the desire to send an invitation for connection to the associated contact (e.g., an email which includes a link). A mechanism may also be provided by which the source user can indicate a desire to ignore the suggested connection, in which case that entry would no longer appear in the list.

Another form of connections activation is "mesh" activation in which a single user can activate social connections for an interconnected set of contacts. A mesh activation database stores the set of targets as well as the source user who is simply considered as one of the contacts in the group. Each entry includes 3 fields, a mesh group id, a user identifier (a GUID or some other identity token, e.g., an email address), and an action state indicating "accepted," "denied," or "pending." Another table associates the mesh group id with the mesh group creation time. On creation of the mesh, the source user is in the "accepted" state by default. All other contacts or users in the mesh group are initially in the "pending" state.

When other users in the mesh group accept the invitation, they are connected to everyone in the group that has already accepted and placed in the "accepted" state. An accepting user is placed in the same state as a user that has accepted the invitation from everyone in the mesh group that has also accepted, and sends out an invitation to the remaining members of the group. When users in the mesh group deny the invitation, they are placed in the "denied" state. When all users in the mesh are either in the "accepted" or "denied" state, the mesh invitation is complete, and the non-accepting entries can then be removed.

For contacts in the pending state, invitations are resent when those contacts have been in the "pending" state for some configurable period of time, e.g., 15 days. The mesh invitation is considered completed if all users are either in the "accepted" or "denied" state, or in the "pending" state longer than another configurable period of time, e.g., 30 days. The non-accepting entries can then be removed.

As will be understood, a wide variety of user interface features may be employed in conjunction with various embodiments of the present invention (see, for example, the interfaces of FIGS. 1-3 and 5-18). According to the implementation described in the immediately preceding paragraphs, and as shown in FIG. 19, each of the proposed connections in the suggested contacts list is represented with an image, a first name, and a last name. A detailed view of each proposed connection may also be presented which includes other available information such as, for example, an email address, phone number, category, network affiliation, connection to connection, etc. Icons may also be presented which indicate whether the contact is already in a particular social network. This information is particularly relevant when the source user is inviting friends to sign up for a new social network.

Figure 20:
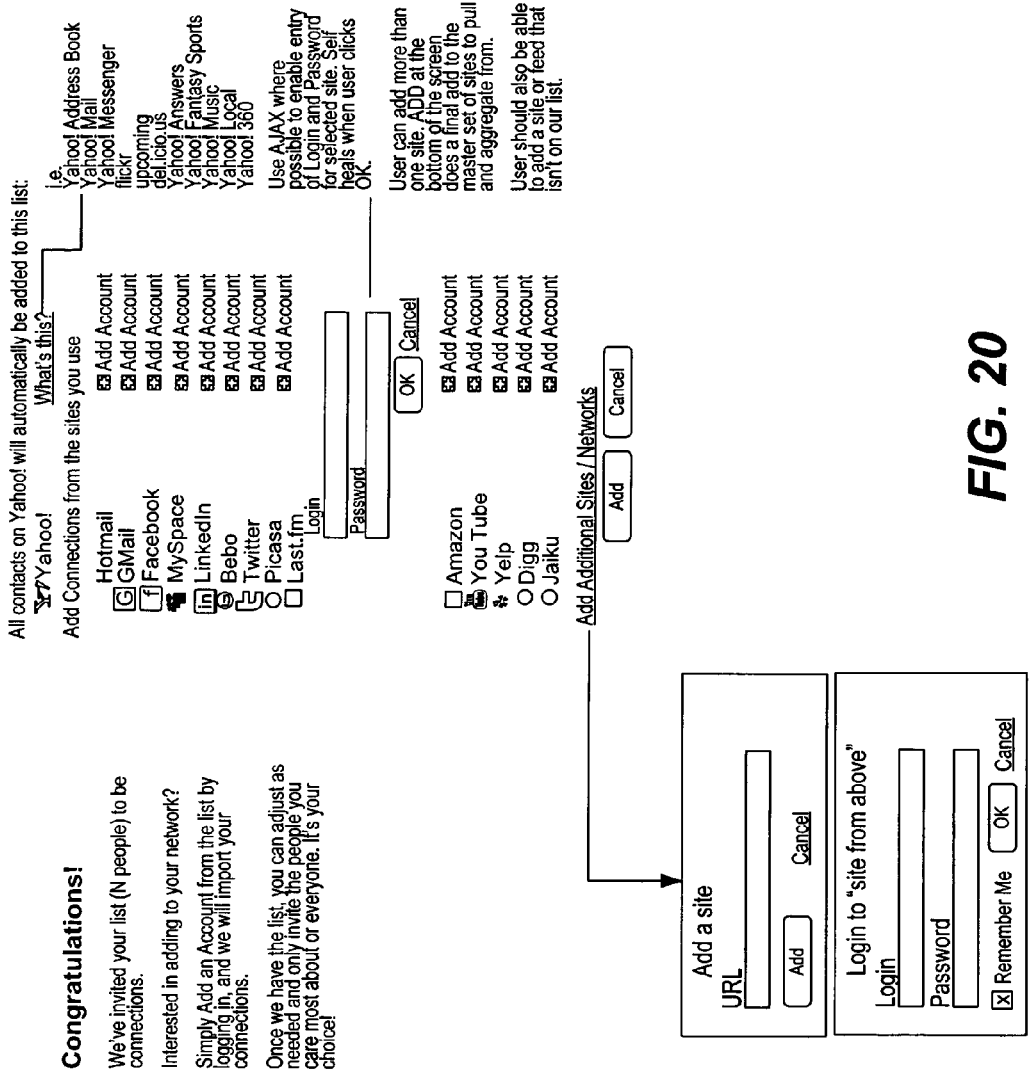

Icons indicating the source of the data for a given contact may also be included, as well as mechanisms for adding or removing sources. For example, as shown in FIGS. 5-18, a drop down menu may be provided from which the source user can select from among available sources. Alternatively, a page devoted to adding or removing sources may be presented as shown in FIG. 20. The sources include the Yahoo!® network and possibly specific properties within the Yahoo!® network, external sources (e.g., other networks, social networking sites, communication systems, etc.), as well as any address book or contact information which may be resident on the user's device or remotely stored. Each may be presented in with an associated logo and source name. Detailed views for each source may be presented which include input fields by which the source user may provide any necessary login or password information so that the Connections Activator may gain access to the sources of additional data.

According to one embodiment, a control is associated with the contact list which allows the user to affect the number of contacts displayed. An example is shown in FIG. 19 in which a slider is provided which represents the range of closeness of relationships that moves from "Closest" to "All" which has the effect of filtering the number of contacts displayed based on the normalized weight scale. Initially, a default number of contacts (e.g., 50) are displayed with the default being reflected in the position of the slider.

It should be noted that the source user can enter the Connections Activator flow from various points and contexts. For example, the source user may not be a member of the Yahoo!® network. In such a case, the Connections Activator will not be able to mine existing data about the user (e.g., identity tokens) from Yahoo!® databases until the user registers. Alternatively, an existing Yahoo!® member may enter the flow for the first time or as a repeat user via a supplemental registration process. In addition, the source user can enter the flow from a variety of contexts. For example, the flow can begin in Yahoo!® Mail. Alternatively, the flow can be initiated from the user's Yahoo!® 360 page. Another alternative is the flow may be entered from the Yahoo! oneConnect mobile service. The flow may even be entered from an external network or system.

According to one embodiment, a connections activation flow may even be initiated by the system itself. For example, if a pattern of communication is detected between a particular user and a fixed group, the user can be offered the ability to use the Connections Activator to activate her connections in the typical "hub and spokes" topology (user is the hub, spokes connect the user to her connections). Alternatively, the user may create a mesh group as described above. This mesh group activation process provides an easy way for the user to communicate with this group of users, but will also send out invitations to each of the members of the group to connect with every other member of the group (if they are not already connected). By accepting membership into this group, the user agrees to be connected to every other member of that group.

According to various embodiments, the relevance of a connection may not only be based on its social nature (i.e., the "Who"), but on various other characteristics as well, e.g., its spatial aspect (i.e., the "Where"), its temporal aspect (the "When"), and/or its topical (i.e., the "What") aspect. The relevance of these additional spatial, temporal, and topical aspects may be determined by analyzing the similarity of these aspects among contacts as well as patterns of these similarities within and among the respective social, spatial, temporal, and topical aspects. For example, embodiments are contemplated which are operable to group contacts by spatial and temporal proximity, i.e., contacts which are currently near the user's location. Spatial information may be readily determined with reference to, for example, location and/or proximity data associated with mobile devices, GPS systems, etc. Temporal information is also widely available in the various systems which may be aggregated in accordance with the invention. Topical information related to a contact is available from a variety of sources including, but not limited to, the content of the communications among contacts as well as explicit profile data (such as declared interests) expressed on a contact's profile on one or more social network services. Moreover, given the dynamic nature of the various types of metadata associated with individuals and relationships, the relevance algorithm employed to group or rank contacts may recompute the relevance measures periodically and/or in response to changes in metadata. This may result in information which is more contextually relevant to the user.

An example of an implementation embodying such concepts will now be described with reference to FIGS. 21-25. This example, referred to in the drawings as Yahoo! oneConnect, is implemented in the context of a mobile device, and is operable to aggregate not only vitality, but various forms of direct communication, e.g., instant messaging, SMS, email, voice, etc., using the contact information associated with each contact.

Figure 21:
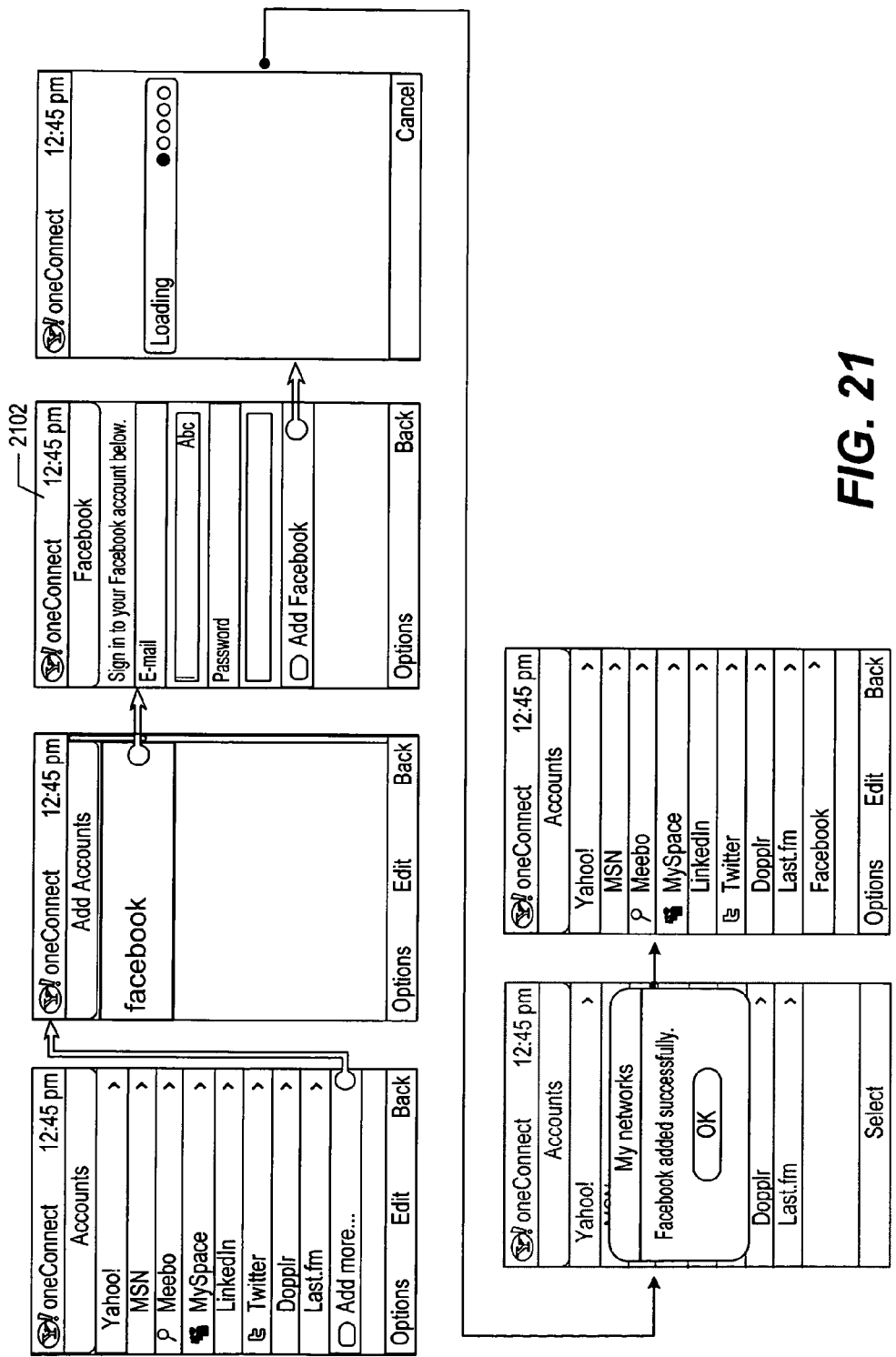
Figure 22A:
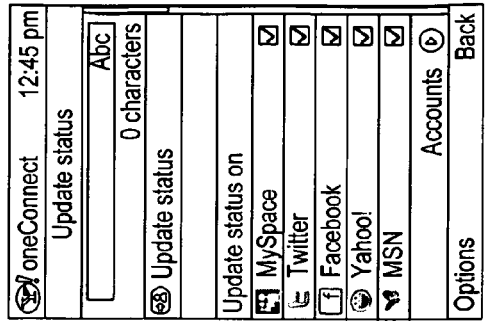
Figure 22B:
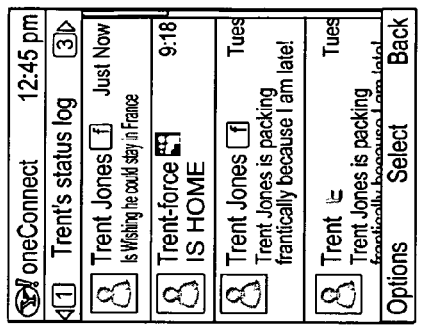
Figure 22C:
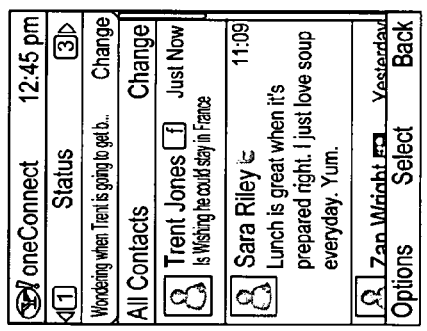
Figure 22D:
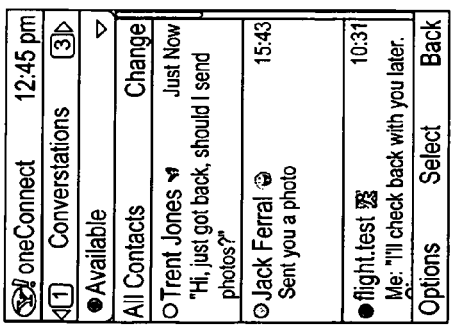

The screens of FIG. 21 show a flow by which contacts associated with the user's Facebook account can be aggregated along with those from other networks and communications channels using the user's login information for Facebook (screen 2102). And once the user's networks and/or channels are aggregated, a variety of different views of the available information may be presented according to various schema. For example, conversations with the user's contacts in various communication channels may be presented as shown in FIG. 22(A). In another example, the current status of the user's contacts in various networks may be presented as shown in FIG. 22(B). The information presented may also be filtered with reference to a single contact. That is, the vitality and/or events relating to a single contact aggregated from some or all of the networks and/or communication channels may be presented in a single view as shown in FIG. 22(C) by selecting that contact. The user may also be enabled to modify his current status in some or all of the networks or communication channels with which he is associated via the mechanism illustrated in FIG. 22(D).

Figure 23:
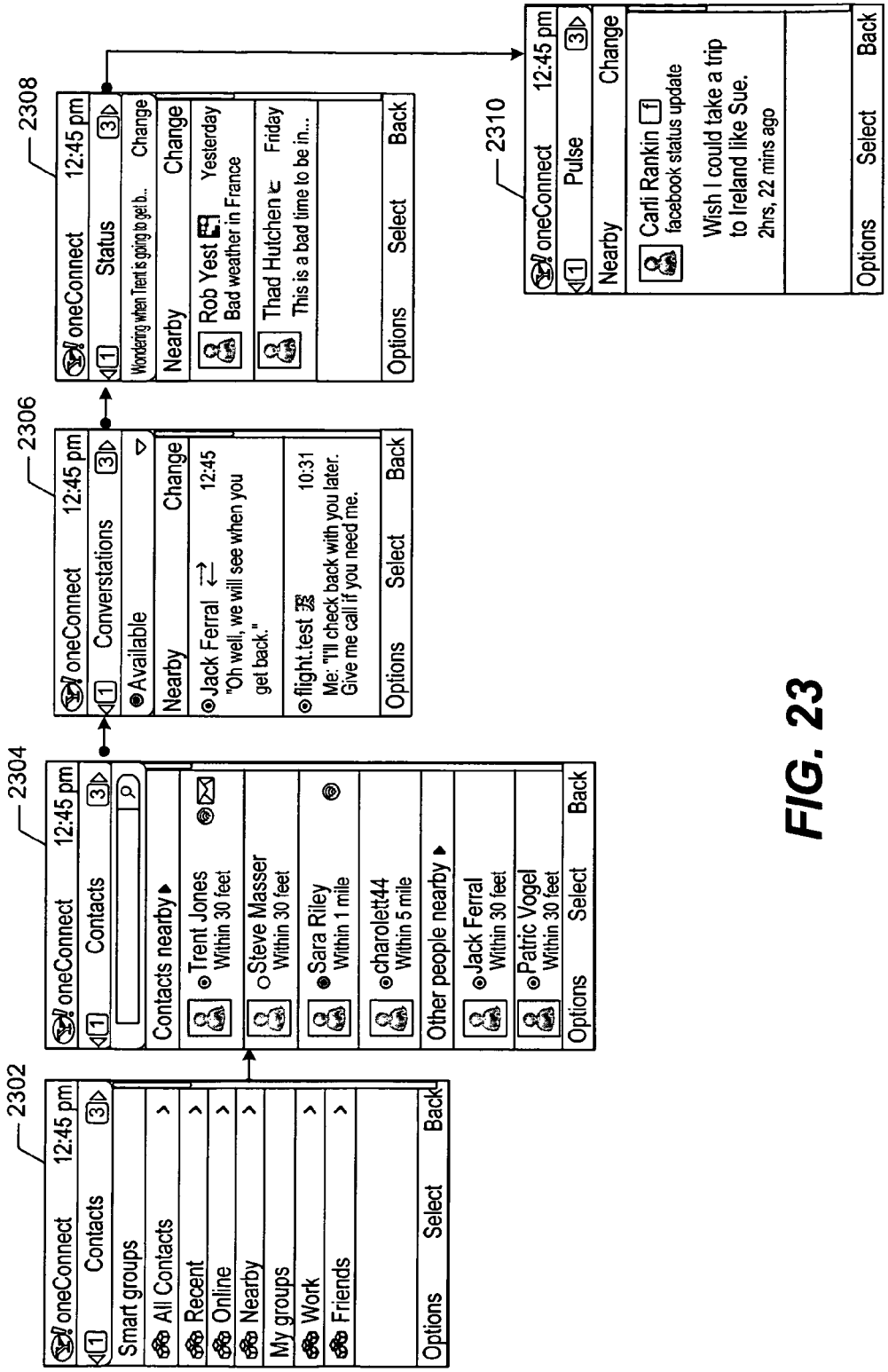
Figure 25:
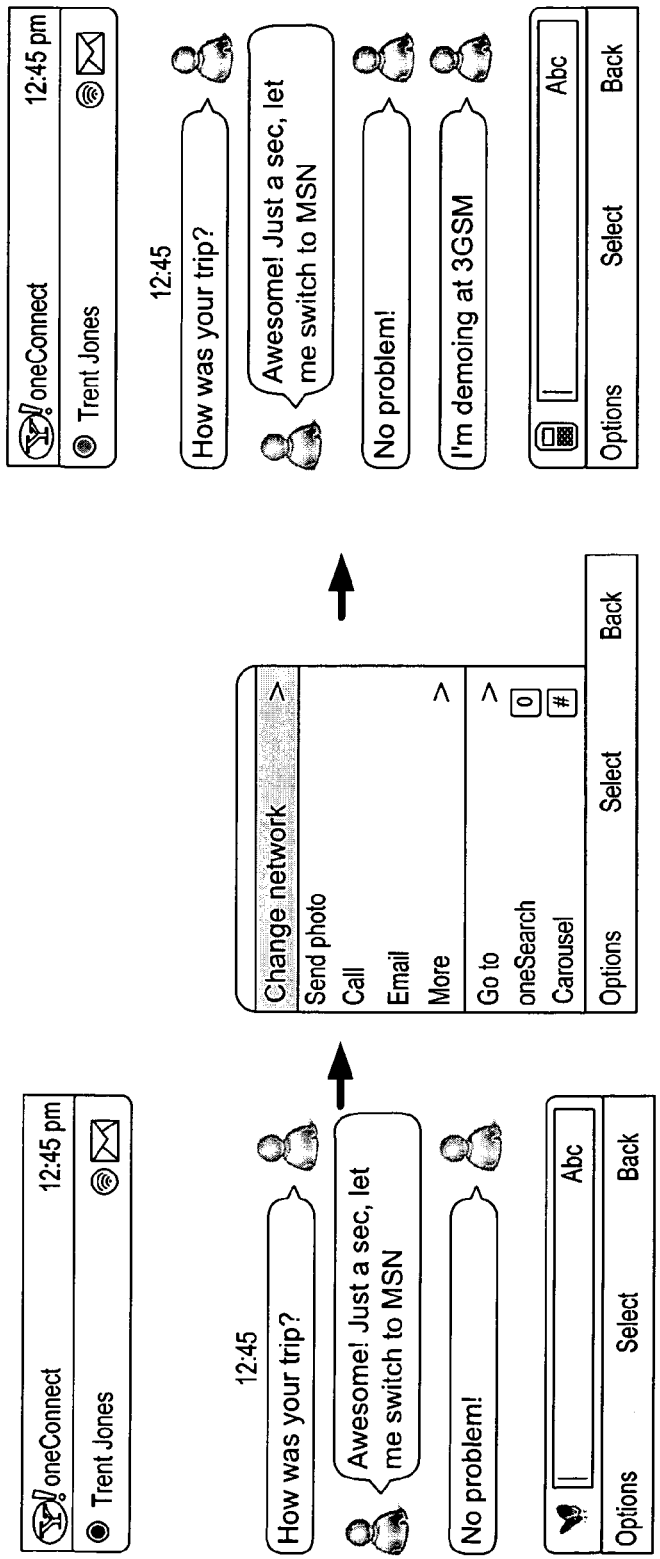

The screens of FIG. 23 illustrate a flow by which a user may select the grouping by which he filters and/or views his contacts. As illustrated in screen 2302, options might include groups defined by the user himself, as well as "Smart Groups" which correspond to a grouping inferred by the system from any of the various data available to the system. User-defined groups might include, for example, Friends and Work groups. Smart Groups might include, for example, a group including all of the user's contacts as identified and aggregated by the system, the most recent contacts with whom the user has been communicating, contacts currently online, contacts which are nearby from a geographic perspective, etc.

By selecting Nearby contacts, the user may view aggregated vitality from his contacts sorted by distance and/or within some programmable threshold distance as illustrated in screen 2304. The user may also be presented with information regarding other people in proximity to the user but which may not yet be identified as a contact for that user. Such individuals may be identified, for example, because they also use the oneConnect service.

The nearby contacts may then be viewed by the user in a variety of ways such as, for example, in terms of ongoing conversations (2306), or current status in various networks (2308). According to some embodiments, the user may view his contacts and their vitality in terms of their most recent activity in any of the various networks and/or communication channels which have been aggregated, e.g., the "Pulse" view shown in screen 2310. The Pulse view may indicate the nature and/or content of the activity, as well as the context and the time at which it occurred. In the example of screen 2310, the nature of the activity is a change to the contact's status in Facebook.

FIG. 24 shows some additional examples of contacts presented in a Pulse view. The screen of FIG. 24(A) includes events relating to any of the user's contacts and is sorted by time. The screen of FIG. 24(B) includes events which are further filtered by geographic proximity to the user's current location. As indicated, such events might include the posting of content (e.g., photos in Flickr, social network posts), actions taken (e.g., tagging a photo, rating a song, installing an application), updating profiles (e.g., adding a job title or new contact information), etc. Virtually any activity within any of the networks or communication channels may be represented.

And because embodiments of the present invention aggregate permissioning models as described above, implementations are contemplated by which users can interact with the various networks of which they are members, as well as communicate via the various channels they employ in a single interface. An example of this is illustrated by the flow in FIG. 25 in which a user is engaging in an online messaging session with a contact in one network and is able to change mid-conversation by selecting another network.

In addition, activity inferred from data associated with a particular network or communication channel may be presented. For example, because the location of a contact's mobile device can be known (if appropriate permissions are granted), the movements of that contact in the physical world may be represented (e.g., the contact traveling from Hamburg to Barcelona).

While the invention has been particularly shown and described with reference to specific embodiments thereof, it will be understood by those skilled in the art that changes in the form and details of the disclosed embodiments may be made without departing from the spirit or scope of the invention. For example, the contexts and data sources to which the descriptions of various embodiments herein refer should not be considered to limit the scope of the invention. Rather, any context in which social relationships may be detected and used, and any data source which can support the basic functionality described herein is within the scope of the present invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for identifying social relationships for a first user operating in a first network controlled by a first entity, comprising:
   ascertaining an identity of the first user with reference to a first data source associated with the first network and under control of the first entity, and at least one external data source outside of the first network and not under control of the first entity, wherein the at least one external data source are within one or more other networks, wherein each external data source employs a permissioning model for controlling access to information associated with the external data source;
   accessing the information associated with the at least one external data source according to the corresponding permissioning model, thereby aggregating the permissioning models associated with the external data sources;
   identifying a plurality of contacts having a relationship with the first user with reference to the first data source, the at least one external data source, and the identity of the first user, a first subset of the contacts not being identifiable from the first data source;
   aggregating vitality events from inside multiple social networks for particular ones of the plurality of contacts, the multiple social networks including the first network and the one or more other networks, wherein aggregating vitality events includes aggregating the vitality events from inside the first network and inside the one or more other networks for the particular ones of the plurality of contacts, wherein the first user is a member of the first network and the one or more other networks, thereby aggregating the vitality events for the particular ones of the plurality of contacts across the multiple social networks;
   wherein the vitality events indicate the nature and/or content of online activities inside the first network and the one or more other networks for the particular ones of the plurality of contacts.

2. The method of claim 1 wherein ascertaining an identity of the first user comprises:
   identifying and aggregating a plurality of identity tokens from the first data source and the at least one external data source.

3. The method of claim 1 wherein each of the first data source and the at least one external data source corresponds to one of a social networking system, a messaging system, a content sharing system, or a member network.

4. The method of claim 1 wherein identifying the plurality of contacts comprises referring to one or more of an address book, a contact list, a message sender, a message recipient, a publisher of content, a subscription to content, or social network data.

5. The method of claim 1, further comprising:
   determining a relevancy measure for each of the contacts which represents a relevance of the relationship between the first user and the contact, the relevancy measure for each contact being determined, at least in part, with reference to one or more of the first data source or the at least one external data source;
   wherein the relevancy measure is further determined with reference to one or more of a frequency of communication, a recency of communication, a volume of communication, a periodicity of communication, a number of connections, a group membership, a demographic characteristic, a name, a relationship category, or a geographic location.

6. The method of claim 5 further comprising ranking the plurality of contacts with reference to the relevancy measures.

7. The method of claim 5 further comprising grouping the plurality of contacts with reference to the relevancy measures.

8. The method of claim 1 further comprising transmitting first invitations to connect with the first user to a subset of the contacts selected by the first user.

9. The method of claim 5 further comprising repeating identifying the plurality of contacts and determining the relevancy measures with reference to an additional external data source identified by the first user.

10. The method of claim 1 further comprising:
    determining that two or more of the plurality of the contacts correspond to one person;
    wherein aggregating vitality events from inside multiple social networks for particular ones of the plurality of contacts includes aggregating the vitality events from inside the first network and inside the one or more other networks for the one person, thereby aggregating the vitality events for the one person across the multiple social networks.

11. The method of claim 5 further comprising:
    determining that two or more of the plurality of the contacts correspond to one person;
    processing messages received by the first user with reference to the relevancy measures, wherein the messages include messages from the one person.

12. A system for identifying social relationships for a first user operating in a first network controlled by a first entity, comprising at least one computing device configured to:
    ascertaining an identity of the first user with reference to a first data source associated with the first network and under control of the first entity, and at least one external data source outside of the first network and not under control of the first entity, wherein the at least one external data source are within one or more other networks, wherein the first user is a member of the first network and the one or more other networks contexts are each associated with a different network of which the first user is a member, wherein each external data source employs a permissioning model for controlling access to information associated with the external data source;
    access the information associated with the at least one external data source according to the corresponding permissioning model, thereby aggregating the permissioning models associated with the external data sources;
    identify a plurality of contacts having a relationship with the first user with reference to the first data source, the at least one external data source, and the identity of the first user, a first subset of the contacts not being identifiable from the first data source;
    and
    aggregating vitality events from inside multiple social networks for particular ones of the plurality of contacts, the multiple social networks including the first network and the one or more other networks, wherein aggregating vitality events includes aggregating the vitality events from inside the first network and inside the one or more other networks for the particular ones of the plurality of contacts, wherein the first user is a member of the first network and the one or more other networks, thereby aggregating the vitality events for the particular ones of the plurality of contacts across the multiple social networks;

wherein the vitality events indicate the nature and/or content of online activities inside the first network and the one or more other networks for the particular ones of the plurality of contacts.

13. A computer program product for identifying social relationships for a first user operating in a first network controlled by a first entity, comprising at least one computer readable medium having computer program instructions stored therein configured to cause at least one computing device to:

ascertain an identity of the first user with reference to a first data source associated with the first network and under control of the first entity, and at least one external data source outside of the first network and not under control of the first entity, wherein the at least one external data source are within one or more other networks, wherein each external data source employs a permissioning model for controlling access to information associated with the external data source;

access the information associated with the at least one external data source according to the corresponding permissioning model, thereby aggregating the permissioning models associated with the external data sources;

identify a plurality of contacts having a relationship with the first user with reference to the first data source, the at least one external data source, and the identity of the first user, a first subset of the contacts not being identifiable from the first data source;

and aggregate vitality events from inside multiple social networks for particular ones of the plurality of contacts, the multiple social networks including the first network and the one or more other networks, wherein the first user is a member of the first network and the one or more other networks, thereby aggregating the vitality events for the particular ones of the plurality of contacts across the multiple social networks;

wherein the vitality events indicate the nature and/or content of online activities inside the first network and the one or more other networks for the particular ones of the plurality of contacts.

14. A computer-implemented method for identifying social relationships for a first user operating in a first network controlled by a first entity, comprising presenting to the first user a plurality of contacts having a relationship with the first user, the plurality of contacts having been determined with reference to a first data source associated with the first network and under control of the first entity, at least one external data source outside of the first network and not under control of the first entity, and an identity of the first user, wherein each external data source employs a permissioning model for controlling access to information associated with the external data source, the identity having been determined with reference to the first data source and the at least one external data source, a first subset of the contacts not being identifiable from the first data source, wherein the plurality of contacts is presented in accordance with a relevancy measure associated with each of the contacts which represents a relevance of the relationship between the first user and the associated contact, the relevancy measure for each contact having been determined with reference to one or more of the first data source or the at least one external data source, wherein the at least one external data source are within one or more other networks, the method further comprising presenting to the first user aggregations of vitality events from inside multiple social networks for particular ones of the plurality of contacts, the multiple social networks including the first network and the one or more other networks, the aggregations having been determined at least in part by accessing the information associated with the at least one external data source according to the corresponding permissioning model, wherein the first user is a member of the first network and the one or more other networks, thereby aggregating the permissioning models associated with the multiple social networks;

wherein the vitality events indicate the nature and/or content of online activities inside the first network and the one or more other networks for the particular ones of the plurality of contacts.

15. The method of claim 14 wherein each of the first data source and the at least one external data source corresponds to one of a social networking system, a messaging system, a content sharing system, or a member network.

16. The method of claim 14 wherein the relevancy measure is representative of one or more of a frequency of communication, a recency of communication, a volume of communication, a periodicity of communication, a number of connections, a group membership, a demographic characteristic, a name, a relationship category, or a geographic location.

17. The method of claim 14 further comprising enabling the first user to select a subset of the contacts to which the first user would like to extend an invitation to connect with the first user.

18. The method of claim 14 further comprising enabling the first user to identify an additional external data source, and presenting a revised version of the plurality of contacts, wherein the revised version of plurality of contacts is presented in accordance with a revised relevancy measure associated with each of the contacts determined with reference to the additional external data source.

19. The method of claim 14 further comprising presenting messages directed to the first user in accordance with the relevancy measures.

20. The method of claim 14 wherein a ranking of the plurality of contacts was conducted with reference to the relevancy measures, and wherein the plurality of contacts is presented in accordance with the ranking.

21. The method of claim 14 wherein a grouping of the plurality of contacts was conducted with reference to the relevancy measures, and wherein the plurality of contacts is presented in accordance with the grouping.

22. The method of claim 14 wherein each of the vitality events indicates a corresponding network, and a time at which the vitality event occurred.

23. The method of claim 14 wherein at least some of the vitality events comprise text updates that indicate changes to a status of a corresponding one of the plurality of contacts.

24. The method of claim 14 wherein the vitality events include posting of content, actions taken, updating profiles, or a combination thereof.

25. The method of claim 14 wherein the vitality events from inside the first network and inside the one or more other networks for particular ones of the plurality of contacts are filtered by geographic proximity with reference to a location associated with the first user.

26. The system of claim 12, wherein each of the two or more of the plurality of contacts has associated therewith a different set of identity tokens or identifiers, wherein each of the two or more of the plurality of contacts corresponds to a different network of which the user is a member, further comprising:

comparing a first set of identity tokens or identifiers of a first one of the plurality of contacts with a second set of identity tokens or identifiers of a second one of the plurality of contacts.

27. The method of claim 1, further comprising:
identifying at least one of relationships or interactions in a second network, wherein the second network is one of the other networks;
identifying at least one of relationships or interactions in a third network, wherein the third network is another one of the other networks;
determining that an identity of an individual in one of the relationships or interactions in the second network corresponds to the same individual in one of the relationships or interactions in the third network; and
aggregating the vitality events for the individual across the second network and the third network.

28. The method of claim 27, wherein the relationship or interaction in the third network is with the first user.

29. The method of claim 27, wherein the relationship or interaction in the third network is not with the first user.

30. The method of claim 1, further comprising:
identifying at least one of relationships or interactions in the first network;
identifying at least one of relationships or interactions in a second network, the second network being one of the other networks;
determining that an identity of an individual in one of the relationships or interactions in the second network corresponds to the same individual in one of the relationships or interactions in the first network; and
aggregating the vitality events for the individual across the second network and the first network.

31. The method of claim 10, a second subset of the contacts being identifiable from the first data source, wherein determining that two or more of the plurality of the contacts correspond to one person comprises:
ascertaining that a first contact in the first subset of the contacts and a second contact in the second subset of the contacts correspond to one person.

32. The method of claim 10, wherein determining that two or more of the plurality of the contacts correspond to one person comprises:
ascertaining that a first contact in the first subset of the contacts and a second contact in the first subset of the contacts correspond to one person.

33. The method of claim 10, wherein determining that two or more of the plurality of the contacts correspond to one person comprises:
identifying at least one of relationships or interactions in the other networks; and
determining that an identity of an individual in one of the relationships or interactions in a second network corresponds to the same individual in a relationship or interaction in a third network, wherein the second network is one of the other networks, and wherein the third network is the first network or another one of the other networks.

34. A system for identifying social relationships for a first user operating in a first social network controlled by a first entity, comprising:
means for ascertaining an identity of the first user with reference to a first data source associated with the first social network and under control of the first entity, and at least one external data source outside of the first social network and not under control of the first entity, wherein the at least one external data source are within one or more other social networks, wherein each external data source employs a permissioning model for controlling access to information associated with the external data source;
means for accessing the information associated with the at least one external data source according to the corresponding permissioning model, thereby aggregating the permissioning models associated with the external data sources;
means for identifying a plurality of contacts having a relationship with the first user with reference to the first data source, the at least one external data source, and the identity of the first user, a first subset of the contacts not being identifiable from the first data source; and
means for aggregating vitality events from inside multiple social networks for particular ones of the plurality of contacts, the multiple social networks including the first social network and the one or more other social networks, wherein the vitality events indicate the nature and/or content of online activities inside the first social network and the one or more other social networks for the particular ones of the plurality of contacts;
wherein the first user is a member of the first social network and the other social networks, thereby aggregating the vitality events for the particular ones of the plurality of contacts across the multiple social networks.

35. The system of claim 34, wherein the at least one external data source or corresponding social network can be selected or identified by the first user, wherein login information pertaining to the at least one external data source or corresponding social network is provided by the first user, and wherein accessing the information associated with the at least one external data source is performed using the login information pertaining to the at least one external data source or corresponding social network.

36. The system of claim 34, wherein the first social network and the other social networks are each associated with a different web site.

37. The system of claim 34, wherein the first social network is a social networking site and the one or more other social networks include one or more social networking sites.

38. The method of claim 10, further comprising:
consolidating the two or more contacts into a single contact for the one person.

39. The system of claim 26, wherein each set of identity tokens or identifiers includes a name or phone number, wherein comparing a first set of identity tokens or identifiers of a first one of the plurality of contacts with a second set of identity tokens or identifiers of a second one of the plurality of contacts comprises:
comparing a name or phone number of the first one of the plurality of contacts with a name or phone number of the second one of the plurality of contacts.

40. The system of claim 26, wherein each set of identity tokens or identifiers includes profile data, wherein comparing a first set of identity tokens or identifiers of a first one of the plurality of contacts with a second set of identity tokens or identifiers of a second one of the plurality of contacts comprises:
comparing profile data of the first one of the plurality of contacts with profile data of the second one of the plurality of contacts.

41. The method of claim 1, wherein each of the multiple social networks is controlled by a service provider.

42. The method of claim 1, wherein each of the multiple social networks is associated with a corresponding web site.

43. The method of claim 1, wherein each of the multiple social networks is a physical network.

44. The method of claim 1, wherein each of the one or more other networks is controlled by a corresponding entity.

* * * * *